(12) United States Patent
Banister

(10) Patent No.: US 7,881,412 B2
(45) Date of Patent: *Feb. 1, 2011

(54) QUASI-LINEAR INTERFERENCE CANCELLATION FOR WIRELESS COMMUNICATION

(75) Inventor: Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 911 days.

This patent is subject to a terminal disclaimer.

(21) Appl. No.: 11/285,510

(22) Filed: Nov. 21, 2005

(65) Prior Publication Data

US 2007/0116099 A1 May 24, 2007

(51) Int. Cl.
*H03D 1/04* (2006.01)
(52) U.S. Cl. ............... 375/346; 370/320; 370/335; 370/342; 375/144; 375/148
(58) Field of Classification Search ............... None
See application file for complete search history.

(56) References Cited

U.S. PATENT DOCUMENTS

| | | | | |
|---|---|---|---|---|
| 5,551,057 | A * | 8/1996 | Mitra | 455/522 |
| 6,108,565 | A * | 8/2000 | Scherzer | 455/562.1 |
| 6,920,192 | B1 * | 7/2005 | Laroia et al. | 375/347 |
| 2003/0030727 | A1 * | 2/2003 | Gibbs et al. | 348/208.2 |
| 2003/0215007 | A1 * | 11/2003 | Mottier | 375/229 |
| 2005/0111405 | A1 | 5/2005 | Kanterakis | |

FOREIGN PATENT DOCUMENTS

EP 0993127 A1 4/2000

OTHER PUBLICATIONS

Patel et al.; Analysis of a DS CDMA successive interference cancellation scheme using correlations; Nov. 29-Dec. 2, 1993; IEEE Global Telecommunications Conference; pp. 76-80.*
Oppenheim et al.; Digital Signal Processing; Prentice Hall, 1975, p. 125.*
Mouhouche et al, "On the Effect on Power and Channel Estimation in Equalized Blind PIC for Downlink Mulitrate CDMA Communications", Signals, Systems, and Computers, 2004. Conference Record of the Thirty-Eighth Asilomar Conference on Pacific Grove, CA, Nov. 7-10, 2004, pp. 612-616, Piscataway, NJ, USA.
International Search Report and Written Opinion, PCT/US2006/061163, International Search Authority/EPO, Sep. 27, 2007, 15 pages.

* cited by examiner

*Primary Examiner*—David C Payne
*Assistant Examiner*—Adolf Dsouza
(74) *Attorney, Agent, or Firm*—Howard H. Seo; Sayed H. Beladi

(57) ABSTRACT

Techniques for performing interference cancellation in a wireless (e.g., CDMA) communication system are described. For a single-sector interference canceller, received samples are processed (e.g., despread) to isolate a signal from a transmitter (e.g., a base station) and obtain input samples. The input samples are transformed based on a first transform (e.g., a fast Hadamard transform) to obtain received symbols for multiple orthogonal channels (e.g., Walsh bins). The received symbols for the multiple orthogonal channels are scaled with multiple gains to obtain scaled symbols. The gains may be related to the inverses of the power estimates for the orthogonal channels. The scaled symbols are transformed based on a second transform (e.g., an inverse fast Hadamard transform) to obtain output samples, which are processed (e.g., spread) to obtain interference-canceled samples having the signal from the transmitter suppressed.

58 Claims, 16 Drawing Sheets

QLIC Block
(for synchronized sectors)

QLIC Block
(for synchronized sectors)

QUASI-LINEAR INTERFERENCE CANCELLATION FOR WIRELESS COMMUNICATION

BACKGROUND

I. Field

The present disclosure relates generally to communication, and more specifically to techniques for performing interference cancellation in a wireless communication system.

II. Background

A wireless multiple-access communication system can concurrently communicate with multiple wireless devices, e.g., cellular phones. Examples of such multiple-access systems include code division multiple access (CDMA) systems, time division multiple access (TDMA) systems, and frequency division multiple access (FDMA) systems.

A wireless multiple-access system typically includes many base stations that provide communication coverage for a large geographic area. Each base station may transmit data to one or more wireless devices located within its coverage area at any given moment. A given wireless device may receive a desired transmission from a serving base station as well as interfering transmissions from nearby base stations. These interfering transmissions are intended for other wireless devices located within the coverage areas of these nearby base stations but act as interference to this given wireless device. The interference hinders the wireless device's ability to demodulate the desired transmission and has a large impact on performance.

There is therefore a need in the art for techniques to demodulate a desired transmission in the presence of interfering transmissions in a wireless communication system.

SUMMARY

Techniques for performing interference cancellation in a wireless communication system (e.g., a CDMA system) are described herein. As used herein, cancellation and suppression are synonymous terms and are used interchangeably. The techniques may improve performance for a wireless device. The techniques may also reduce the effects of interference, which may increase the capacity of an interference limited system such as a CDMA system.

In an embodiment of a single-sector interference canceller, received samples are processed (e.g., despreading) to isolate a signal from a transmitter (e.g., a base station for a sector) and obtain input samples. The input samples are transformed based on a first transform (e.g., a fast Hadamard transform) to obtain received symbols for multiple orthogonal channels (e.g., Walsh bins). The received symbols for the multiple orthogonal channels are scaled with multiple gains to obtain scaled symbols. The gains may be derived by (1) computing power estimates for the orthogonal channels based on the received symbols and (2) computing the gain for each orthogonal channel based on the inverse of the power estimate for that orthogonal channel. The scaled symbols are transformed based on a second transform (e.g., an inverse fast Hadamard transform) to obtain output samples. The output samples are processed (e.g., spread) to obtain interference-canceled samples having the signal from the transmitter suppressed.

In an embodiment of a parallel multi-sector interference canceller, at least one cancellation signal for at least one interfering transmitter is derived by isolating a signal from each interfering transmitter with a spreading code for that interfering transmitter. Each cancellation signal comprises the signal component for an interfering transmitter and may be obtained, e.g., by subtracting the interference-canceled samples for that interfering transmitter from the received samples. A signal estimate for a desired transmitter is derived based on the received signal and the at least one cancellation signal, e.g., by subtracting the cancellation signal(s) from the received signal. Multiple stages may be cascaded to improve interference cancellation performance, as described below.

In an embodiment of a cascaded multi-sector interference canceller, a first cancellation signal for a first transmitter is derived by isolating the signal from this transmitter with a spreading code for the transmitter. The first cancellation signal is subtracted from the received signal to obtain an intermediate signal. A second cancellation signal for a second transmitter is derived based on the intermediate signal. If the first transmitter is the desired transmitter, then a signal estimate for the desired transmitter may be obtained by subtracting the second cancellation signal from the received signal. If the desired transmitter is neither the first nor second transmitter, then the signal estimate for the desired transmitter may be obtained by subtracting the second cancellation signal from the intermediate signal. More than two stages may be cascaded, as described below.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The interference cancellation techniques described herein may be used for various communication systems such as CDMA, TDMA, FDMA, orthogonal frequency division multiple access (OFDMA), and single-carrier FDMA (SC-FDMA) systems. A CDMA system may implement one or more CDMA radio access technologies (RATs) such as cdma2000, Wideband-CDMA (W-CDMA), and so on. cdma2000 covers IS-2000, IS-856, and IS-95 standards. A TDMA system may implement a RAT such as GSM. These various RATs and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. An OFDMA system utilizes OFDM to transmit symbols in the frequency domain on orthogonal frequency subbands. An SC-FDMA system transmits symbols in the time domain on orthogonal frequency subbands. For clarity, the techniques are described below for a CDMA system, which may be cdma2000 system or a W-CDMA system.

Figure 1:
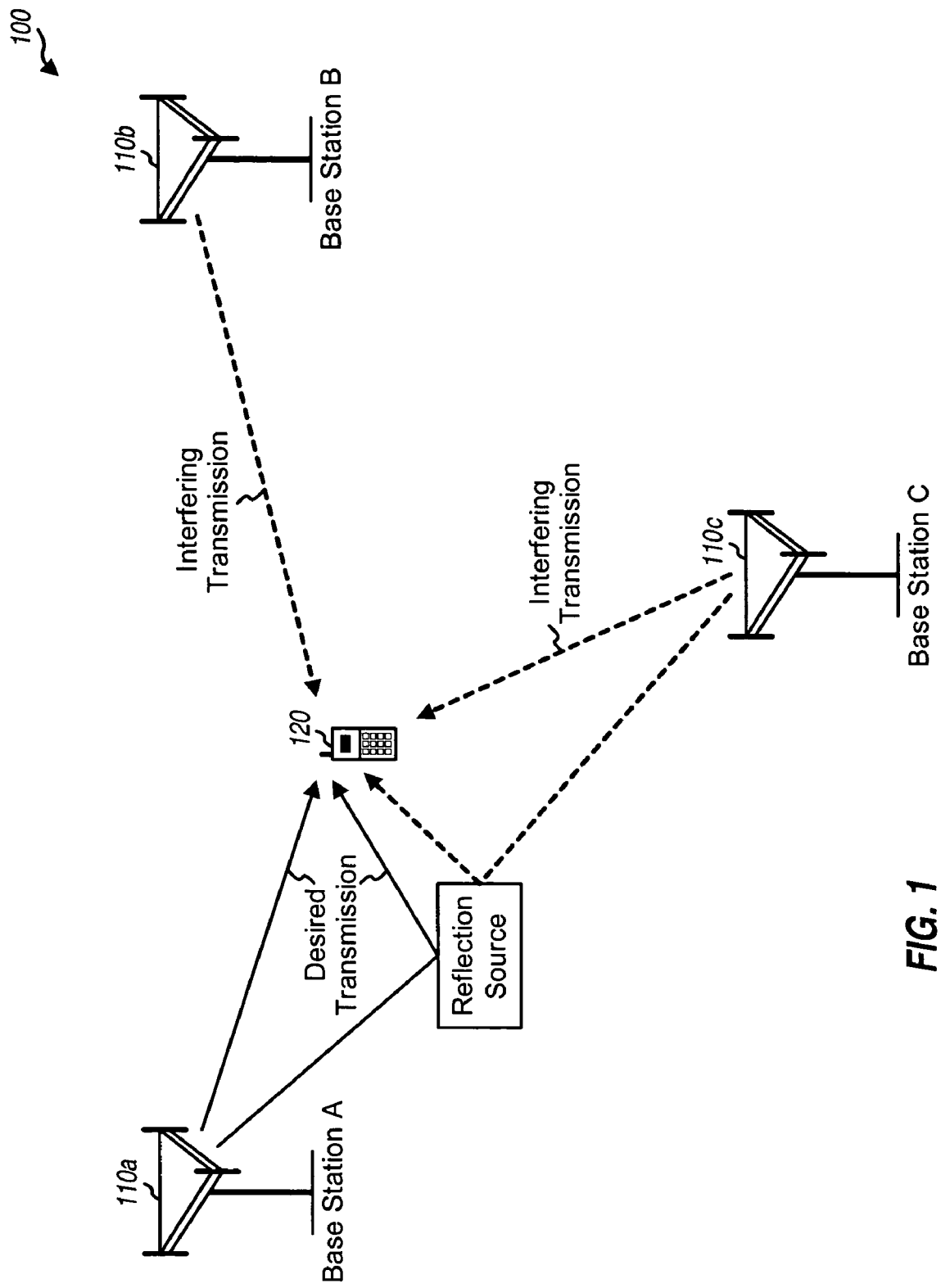
FIG. 1 shows a CDMA system with multiple base stations.

FIG. 1 shows a CDMA system 100 with multiple base stations. For simplicity, FIG. 1 shows only three base stations 110a, 110b and 110c and one wireless device 120. A base station is generally a fixed station that communicates with the wireless devices and may also be called a Node B (3GPP terminology), an access point, or some other terminology. Each base station 110 provides communication coverage for a particular geographic area. The term "cell" can refer to a base station and/or its coverage area depending on the context in which the term is used. To improve system capacity, the base station coverage area may be partitioned into multiple (e.g., three) smaller areas. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The following description assumes that each cell is partitioned into multiple sectors. For simplicity, the term "base station" generically refers to a fixed station for a cell as well as a fixed station for a sector. A serving base station/sector is a base station/sector with which a wireless device communicates.

A wireless device may be fixed or mobile and may also be called a user equipment (UE) (3GPP terminology), a mobile station, a user terminal, or some other terminology. A wireless device may be a cellular phone, a personal digital assistant (PDA), a wireless modem card, and so on. A wireless device may communicate with zero, one, or multiple base stations on the forward link (or downlink) and reverse link (or uplink) at any given moment. For simplicity, FIG. 1 shows only transmissions on the forward link. Wireless device 120 receives a desired transmission from serving base station 110a via line-of-sight and reflected paths and also receives interfering transmissions from neighbor base stations 110b and 110c via line-of-sight and reflected paths.

Figure 2:
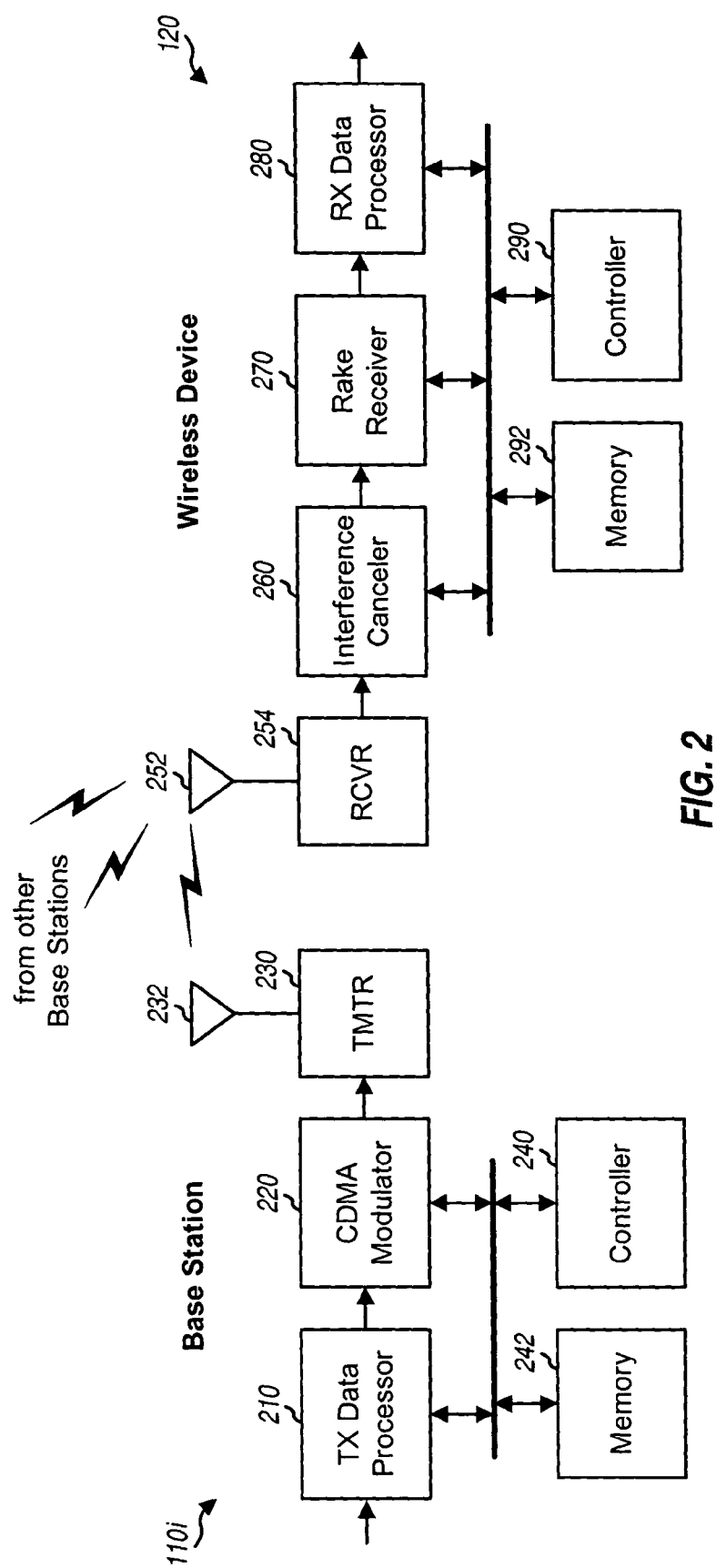
FIG. 2 shows a block diagram of a base station and a wireless device.

FIG. 2 shows a block diagram of a base station 110i and wireless device 120. Base station 110i may be any one of the base stations shown in FIG. 1. For simplicity, FIG. 2 shows base station 110i having one transmit antenna and wireless device 120 having one receive antenna. In general, base station 110i and wireless device 120 may each be equipped with any number of antennas. For simplicity, FIG. 1 shows only the processing units for data transmission on the forward link.

At base station 110i, a transmit (TX) data processor 210 receives traffic data for the wireless devices being served, processes (e.g., encodes, interleaves, and symbol maps) the traffic data to generate data symbols, and provides the data symbols to a CDMA modulator 220. As used herein, a data symbol is a modulation symbol for data, a pilot symbol is a modulation symbol for pilot, a modulation symbol is a complex value for a point in a signal constellation (e.g., for M-PSK, M-QAM, and so on), a symbol is a complex value, and pilot is data that is known a priori by both the base stations and the wireless devices. CDMA modulator 220 processes the data symbols and pilot symbols as described below and provides a stream of output chips to a transmitter unit (TMTR) 230. Transmitter unit 230 processes (e.g., converts to analog, amplifies, filters, and frequency upconverts) the output chip stream and generates a forward link signal, which is transmitted from an antenna 232.

At wireless device 120, an antenna 252 receives the forward link signals transmitted by base station 110i as well as other base stations. Antenna 252 provides a received signal to a receiver unit (RCVR) 254. Receiver unit 254 processes (e.g., filters, amplifies, frequency downconverts, and digitizes) the received signal and provides received samples to an interference canceller 260. Interference canceller 260 estimates and suppresses the interference from interfering base stations as described below and provides interference-canceled samples for the serving base station to a rake receiver 270. Antenna 252 may receive the forward link signal from the serving base station via one or more signal paths as shown in FIG. 1, and the received signal may thus include one or more signal instances (or multipaths) for the serving base station. Rake receiver 270 processes all multipaths of interest and provides data symbol estimates, which are estimates of the data symbols sent by the serving base station. Rake receiver 270 may also be replaced with an equalizer or some other types of receiver. A receive (RX) data processor 280 processes (e.g., symbol demaps, deinterleaves, and decodes) the data symbol estimates and provides decoded data. In general, the processing by rake receiver 270 and RX data processor 280 is complementary to the processing by CDMA modulator 220 and TX data processor 210, respectively, at base station 110i.

Controllers 240 and 290 direct operation of various processing units at base station 110i and wireless device 120, respectively. Memories 242 and 292 store data and program codes for base station 110i and wireless device 120, respectively.

For CDMA, multiple orthogonal channels may be obtained with different orthogonal codes. For example, multiple orthogonal traffic channels are obtained with different Walsh codes in cdma2000, and multiple orthogonal physical channels are obtained with different orthogonal variable spreading factor (OVSF) codes in W-CDMA. The orthogonal channels may be used to send different types of data (e.g., traffic data, broadcast data, control data, pilot, and so on) and/or traffic data for different wireless devices. The orthogonal channels are appropriately scaled, combined, and spectrally spread across the entire system bandwidth. The spectral spreading is performed with a spreading code, which is a pseudo-random number (PN) sequence in cdma2000 and a scrambling code in W-CDMA. For cdma2000, the channelization with Walsh codes is called "covering", and the spectral spreading is called "spreading". For W-CDMA, the channelization with OVSF codes is called "spreading", and the spectral spreading is called "scrambling". For clarity, cdma2000 terminology (e.g., traffic channel, covering, spreading, and so on) is used in the following description.

Figure 3:
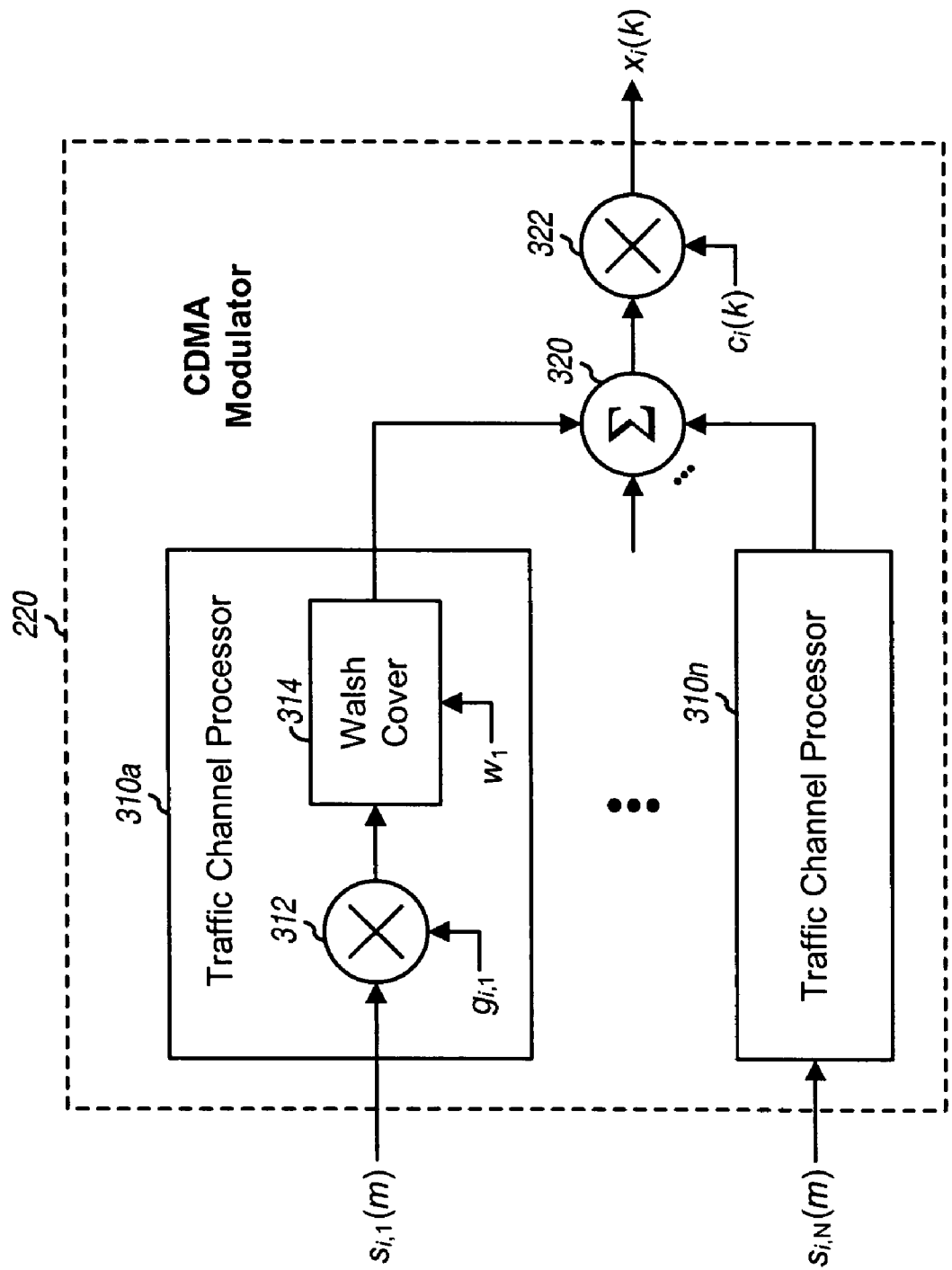
FIG. 3 shows a CDMA modulator at the base station.

FIG. 3 shows a block diagram of CDMA modulator 220 within base station 110i. For simplicity, the following description assumes that N traffic channels are available for each sector, and each traffic channel is assigned a different Walsh code of length N, where N may be equal to 4, 8, 16, 32, 64 or 128 for cdma2000. In general, orthogonal codes of different lengths may be used for the traffic channels, and N may correspond to the length of the longest orthogonal code.

CDMA modulator 220 includes N traffic channel processors 310a through 310n for the N traffic channels. Within each traffic channel processor 310, a multiplier 312 receives and scales the data symbols for traffic channel n with a gain $g_{i,n}$ for traffic channel n and provides scaled data symbols. The gain $g_{i,n}$ may be set to zero if traffic channel n is not used. A Walsh cover unit 314 channelizes the scaled data symbols with a Walsh code $w_n$ assigned to traffic channel n. Unit 314 performs covering by repeating each scaled data symbol multiple times to generate N replicated symbols and then multiplying the N replicated symbols with the N chips of Walsh code $w_n$ to generate N data chips for that data symbol. A combiner 320 receives and adds the data chips for all N traffic channels. A multiplier 322 multiplies the combined data chips with a spreading code assigned to sector i and generates output chips.

The output chips for sector i may be expressed in discrete time, as follows:

$$x_i(k) = \sum_{n=1}^{N} c_i(k) \cdot w_n(\mod(k, N)) \cdot g_{i,n} \cdot s_{i,n}(\lfloor k/N \rfloor), \qquad \text{Eq (1)}$$

where
k is an index for chip period;
n is an index for traffic channel;
i is an index for sector;
$s_{i,n}(\lfloor k/N \rfloor)$ is a data symbol sent in chip period k;
$w_{i,n}(\mod(k,N))$ is a Walsh chip for chip period k;
$g_{i,n}$ is the gain for traffic channel n in sector i;
$c_i(k)$ is a spreading code chip for sector i in chip period k; and
$x_i(k)$ is an output chip for sector i in chip period k.

Each data symbol is sent in N chip periods, and data symbol $s_{i,n}(m)$ for symbol period m is sent in chip periods k=N·m through N·m+N−1. Hence, $m=\lfloor k/N \rfloor$ and $s_{i,n}(m)=s_{i,n}(\lfloor k/N \rfloor)$, where "$\lfloor x \rfloor$" denotes a floor operator. The data symbols, Walsh chips, and spreading code chips are assumed to have unit magnitude for all chip periods k, symbol periods m, and traffic channels n, or $|s_{i,n}(m)|=|w_n(\mod(k,N))|=|c_i(k)|=1$ for ∀k,m,n. The spreading codes for different sectors are uncorrelated, with $E\{c_i(k)\cdot c^*_j(k+\kappa)\}=\delta(\kappa)\cdot\delta(i,j)$, which means that the expected value between the spreading codes for sectors i and j is equal to one only if κ=0 and i=j. Different sectors are assigned different shifted versions of the same PN sequence in cdma2000, in which case the spreading codes for different sectors are uncorrelated over a range of chip offsets.

Equation (1) may be expressed in matrix form, as follows:

$$\underline{x}_i(m) = \underline{C}_i(m) \cdot \underline{W} \cdot \underline{G}_i \cdot \underline{s}_i(m), \qquad \text{Eq (2)}$$

where
$\underline{s}_i(m) = [s_{i,1}(m)\ s_{i,2}(m)\ \ldots\ s_{i,N}(m)]^T$ is an N×1 vector containing N data symbols to be sent on the N traffic channels in symbol period m, where "$^T$" denotes a transpose;
$\underline{G}_i$ is an N×N diagonal matrix containing the gains for the N traffic channels, or diag $(\underline{G}_i)=\{g_{i,1}, g_{i,2}, \ldots, g_{i,N}\}$;
$\underline{W}$ is an N×N Walsh matrix containing N Walsh codes in N columns;
$\underline{C}_i(m)$ is an N×N diagonal matrix containing N spreading code chips for N chip periods in symbol period m, or diag$(\underline{C}_i(m))=\{c_i(N\cdot m), c_i(N\cdot m+1), \ldots, c_i(N\cdot m+N-1)\}$; and
$\underline{x}_i(m) = [x_i(N\cdot m)\ x_i(N\cdot m+1) \ldots x_i(N\cdot m+N-1)]^T$ is an N×1 vector containing N output chips for sector i in symbol period m.

A diagonal matrix contains possible non-zero values along the diagonal and zeros elsewhere. If the traffic channels have different Walsh code lengths, then N is equal to the longest Walsh code length for all traffic channels, and each shorter Walsh code is repeated in matrix $\underline{W}$.

Wireless device 120 receives the forward link signals from base station 110i and other base stations. The received samples from receiver unit 254 may be expressed as:

$$\underline{r}(m) = \sum_i \alpha_i \cdot \underline{x}_i(m) + \underline{n}(m), \qquad \text{Eq (3)}$$

where
$\alpha_i$ is a channel gain for sector i;
$\underline{n}(m)$ is an N×1 vector of noise and interference not included in $\underline{x}_i(m)$; and
$\underline{r}(m)$ is an N×1 vector containing N received samples for symbol period m.

Equation (3) assumes that all sectors are synchronized and that there is a single signal path (i.e., no multipath) for each sector. For simplicity, the noise and interference in $\underline{n}(m)$ may be assumed to be additive white Gaussian noise (AWGN) with a zero mean vector and a covariance matrix of $N_0 \cdot \underline{I}$, where $N_0$ is the variance of the noise and interference, and $\underline{I}$ is the identity matrix with ones along the diagonal and zeros elsewhere.

In equation (3), $\underline{r}(m)$ is a received vector for one symbol period. The received vectors for different symbol periods are uncorrelated due to the use of spreading codes that are temporally uncorrelated. Hence, there is no dependence across different symbol periods and, for clarity, index m is omitted in the following description.

Wireless device 120 may derive estimates of the data symbols transmitted by a given sector j on traffic channel n by (1) despreading the received samples with the spreading code used by sector j and (2) decovering the despread samples with the Walsh code for traffic channel n, as follows:

$$\check{s}_{j,n} = \underline{w}_n^T \cdot \underline{C}_j^H \cdot \underline{r}, \qquad \text{Eq (4)}$$

where
$\underline{C}_j$ is an N×N diagonal matrix containing the spreading code chips for sector j, where "$^H$" denotes a conjugate transpose;
$\underline{w}_n$ is an N×1 vector containing the Walsh code for the desired traffic channel n;
$s_{j,n}$ is a data symbol sent by sector j on traffic channel n; and
$\check{s}_{j,n}$ is an estimate of $s_{j,n}$ without interference cancellation.

To cancel the interference from an interfering sector l, wireless device 120 may despread the received samples with the spreading code used by sector l and then decover the despread samples, as follows:

$$\underline{u}_l = \underline{W}^T \cdot \underline{C}_l^H \cdot \underline{r}, \qquad \text{Eq (5)}$$

where $\underline{u}_l$ is an N×1 vector containing N received symbols for N Walsh bins for sector l. The multiplication by $\underline{C}_l^H$ despreads the received samples for sector l, and the multiplication by $\underline{W}^T$ generates received symbols for the N Walsh bins. The N Walsh bins are for N traffic channels if these traffic channels are assigned N different Walsh codes of length N. The N Walsh bins may be viewed as corresponding to N orthogonal channels obtained via the decovering with $\underline{W}^T$.

A covariance matrix $\underline{\Lambda}_l$ for vector $\underline{u}_l$ may be expressed as:

$$\begin{aligned}\underline{\Lambda}_l &= E\{\underline{u}_l \cdot \underline{u}_l^H\} \\ &= N^2 \cdot |\alpha_l|^2 \cdot \underline{G}_l^2 + N \cdot \left(\sum_{i \neq l}\sum_{n=1}^{N}|\alpha_i|^2 \cdot g_{i,n}^2 + N_0\right) \cdot \underline{I}, \\ &= q_l \cdot \underline{G}_l^2 + \sigma^2 \cdot \underline{I},\end{aligned} \qquad \text{Eq (6)}$$

where $q_l = N^2 \cdot |\alpha_l|^2$ is a channel power gain for sector l; and $$\sigma^2 = N \cdot \left(\sum_{i \neq l}\sum_{n=1}^{N}|\alpha_i|^2 \cdot g_{i,n}^2 + N_0\right)$$

is a total power gain for all other sectors. The covariance matrix $\underline{\Lambda}_l$ may be given as diag $(\underline{\Lambda}_l) = \{\lambda_{l,1}, \lambda_{l,2}, \ldots, \lambda_{l,N}\}$, where $$\lambda_{l,n} = N^2 \cdot |\alpha_l|^2 \cdot g_{l,n}^2 + N \cdot \left(\sum_{i \neq l}\sum_{n=1}^{N}|\alpha_i|^2 \cdot g_{i,n}^2 + N_0\right),$$

for $n=1, \ldots, N$. The diagonal elements of $\underline{\Lambda}_l$ are measured powers (or eigenvalues) for the N Walsh bins. $\underline{\Lambda}_l$ is equi-diagonal if all N diagonal elements are equal, or $\lambda_{l,n} = \lambda_l$ for $\forall n$.

Wireless device 120 may derive symbol estimates for traffic channel n of serving sector j based on various techniques such as a linear minimum mean square error (LMMSE) technique, a least squares (LS) technique, and so on. Symbol estimates for traffic channel n of sector j may be derived based on the LMMSE technique, as follows:

$$\begin{aligned}\hat{\hat{s}}_{j,n} &= E\left(s_{j,n}^* \cdot \underline{u}_l \mid \underline{C}_j, \underline{C}_l\right)^H \cdot \underline{\Omega}_l^{-1} \cdot \underline{u}_l, \\ &= E\left(s_{j,n}^* \cdot \left(\underline{W}^T \cdot \underline{C}_l^H \sum_i \alpha_i \cdot \underline{C}_i \cdot \underline{W} \cdot \underline{G}_i \cdot \underline{s}_i + \underline{W}^T \cdot \underline{C}_l^H \cdot \underline{n}\right) \mid \underline{C}_j, \underline{C}_l\right)^H \cdot \underline{\Lambda}_l^{-1} \cdot \underline{u}_l, \\ &= \alpha_j^* \cdot g_{j,n} \cdot \underline{w}_n^T \cdot \underline{C}_j^H \cdot \underline{C}_l \cdot \underline{W} \cdot \underline{\Lambda}_l^{-1} \cdot \underline{u}_l.\end{aligned} \qquad \text{Eq (7)}$$

where $\hat{\hat{s}}_{j,n}$ is an LMMSE estimate of $s_{j,n}$.

The LMMSE symbol estimation in equation (7) may be combined with equation (5) and then broken into smaller equations, as follows:

$$\underline{r}_l = \underline{C}_l \cdot \underline{W} \cdot \underline{\Lambda}_l^{-1} \cdot \underline{W}^T \cdot \underline{C}_l^H \cdot \underline{r}, \qquad \text{Eq (8)}$$

$$\hat{s}_{j,n} = \underline{w}_n^T \cdot \underline{C}_j^H \cdot \underline{r}_l, \text{ and} \qquad \text{Eq (9)}$$

$$\hat{\hat{s}}_{j,n} = \alpha_j^* \cdot g_{j,n} \cdot \hat{s}_{j,n}, \qquad \text{Eq (10)}$$

where $\underline{r}_l$ is an N×1 vector containing N interference-canceled samples having the signal component for sector l suppressed;

$\underline{\Lambda}_l^{-1}$ is an N×N diagonal matrix given as diag $(\underline{\Lambda}_l^{-1}) = \{\lambda_{l,1}^{-1}, \lambda_{l,2}^{-1}, \ldots, \lambda_{l,N}^{-1}\}$;

$\hat{s}_{j,n}$ is an unweighted estimate of $s_{j,n}$; and $\hat{\hat{s}}_{j,n}$ is a weighted estimate of $s_{j,n}$.

Equation (8) represents interference cancellation for one interfering sector l. Equation (8) may be considered as including both linear operations (e.g., the transformations by $\underline{W}^T$ and $\underline{W}$) and non-linear operations (e.g., the despreading with $\underline{C}_l^H$ and spreading with $\underline{C}_l$). Equation (8) may thus be viewed as performing quasi-linear interference cancellation (QLIC) because the waveform is first multiplied by a time varying function (e.g. the despreading code), which is the same function as a component of the waveform (i.e., the multiplication term is itself a function of the received waveform). Vector $\underline{r}_l$ contains samples having the interference from sector l suppressed. Equation (9) indicates that the remaining LMMSE symbol estimation for $s_{j,n}$ includes simple despread and decover operations that are conventionally done by a CDMA receiver, as shown in equation (4). In particular, vector $\underline{r}_l$ is despread with the spreading code for the desired sector j and then decovered with the Walsh code for the desired traffic channel n. Equation (10) shows the LMMSE scaling to obtain the weighted estimate for subsequent decoding.

As shown in equation (6), the diagonal elements of $\underline{\Lambda}_l$ are determined in part by the gain matrix $\underline{G}_l$ for interfering sector l. If the gains for all N traffic channels in sector t are equal (i.e., $g_{l,n} = g_l$ for $\forall n$), then $\underline{G}_l = g_l \cdot \underline{I}$ and $\underline{\Lambda}_l = \eta \cdot \underline{I}$, where $\eta$ is an overall power gain. In this case, $$\underline{r}_l = \frac{1}{\eta}\underline{r}$$

and the unweighted symbol estimate $\hat{s}_{j,n}$ from equation (9) is equal to the symbol estimate $\check{s}_{j,n}$ from equation (4) without interference cancellation. Interference cancellation is achieved when the gains in matrix $\underline{G}_l$ are not equal, so that traffic channels with larger gains are attenuated more by the multiplication with the inverted covariance matrix $\underline{\Lambda}_l^{-1}$ in equation (8).

Figure 4:
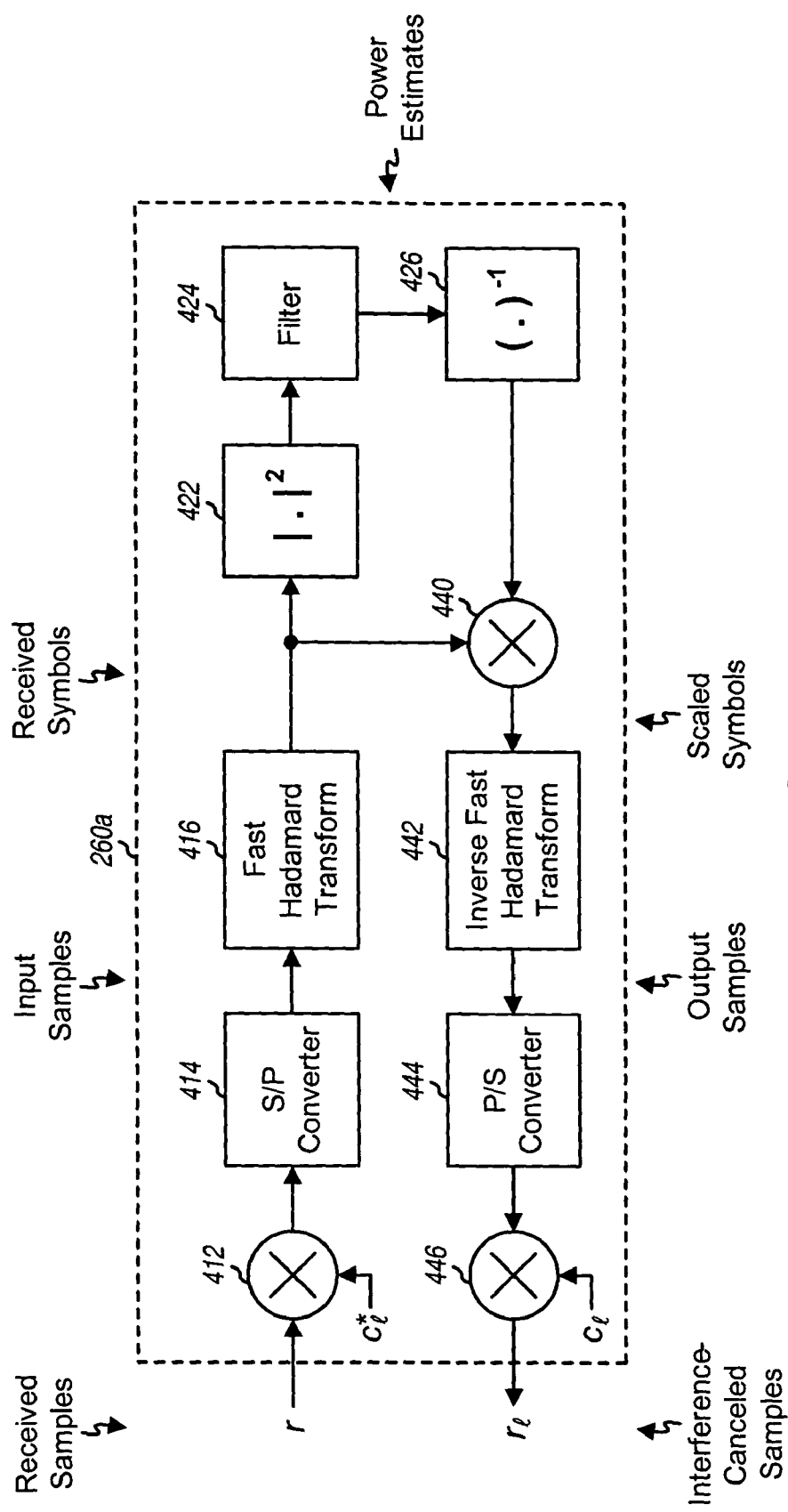
FIG. 4 shows a single-sector interference canceller.

FIG. 4 shows a block diagram of a single-sector interference canceller 260a, which is an embodiment of interference canceller 260 in FIG. 2. Within interference canceller 260a, a multiplier 412 multiplies the received samples r with a complex-conjugated spreading code $c_l^*$ for sector l and provides input samples. A serial-to-parallel (S/P) converter 414 forms a vector of N input samples for each symbol period and provides the N input samples in parallel. A fast Hadamard transform (FHT) unit 416 performs an N-point FHT on the N input samples for each symbol period and provides N received symbols for N Walsh bins.

A unit 422 computes the squared magnitude of each received symbol from FHT unit 416. A filter 424 averages the squared magnitude of the received symbols for each Walsh bin and provides a power estimate $\hat{\lambda}_{l,n}$ for that Walsh bin. Filter 424 provides an estimate of the diagonal elements of $\underline{\Lambda}_l$. Filter 424 may be implemented with a finite impulse response (FIR) filter, an infinite impulse response (IIR) filter, or some other type of filter. Filter 424 may have a time constant of, e.g., 32, 64, 128, or some other number of symbol periods. A unit 426 computes the inverse of the power estimate for each Walsh bin. A multiplier 440 obtains N received symbols for the N Walsh bins in each symbol period, multiplies the received symbol for each Walsh bin with the inverse power estimate for that Walsh bin, and provides N scaled symbols for the N Walsh bins. Units 422, 424, 426 and 440 perform processing on a per Walsh bin basis.

An inverse FHT (IFHT) unit 442 performs an N-point IFHT on the N scaled symbols for each symbol period and provides N output samples for that symbol period. A parallel-to-serial (P/S) converter 444 serializes the N output samples for each symbol period. A multiplier 446 multiplies the output samples with the spreading code for sector l and provides the interference-canceled samples $r_l$.

In FIG. 4, multiplier 412 performs despreading for sector l, which is multiplication with $\underline{C}_l^H$ in equation (8). Serial-to-parallel converter 414 vectorizes the input samples for each symbol period. FHT unit 416 performs decovering for the N traffic channels, which is multiplication with $\underline{W}^T$ in equation (8). FHT unit 416 efficiently projects the vectorized samples into eigenmodes (or orthogonal channels) using Walsh codes and diagonalizes the covariance matrix $\underline{\Lambda}_l$. Unit 422, filter 424, and unit 426 derive an estimate of $\underline{\Lambda}_l^{-1}$. Multiplier 440 scales the N Walsh bins based on the inverses of the power estimates for these Walsh bins. Hence, Walsh bins with larger powers are attenuated more, which reduces the interference contribution from these Walsh bins. Multiplier 440 performs the multiplication with $\underline{\Lambda}_l^{-1}$ in equation (8). IFHT unit 442 performs covering for the N Walsh bins, which is multiplication with $\underline{W}$ in equation (8). Multiplier 446 performs spreading (or respreading) for sector l, which is multiplication with $\underline{C}_l$ in equation (8). The despreading by multiplier 412 and the spreading by multiplier 446 may be considered as non-linear operations because they are directly dependent upon a component of the received waveform. The decorrelation operations by units 416 through 442 for the LMMSE technique are linear operations.

Figure 5:
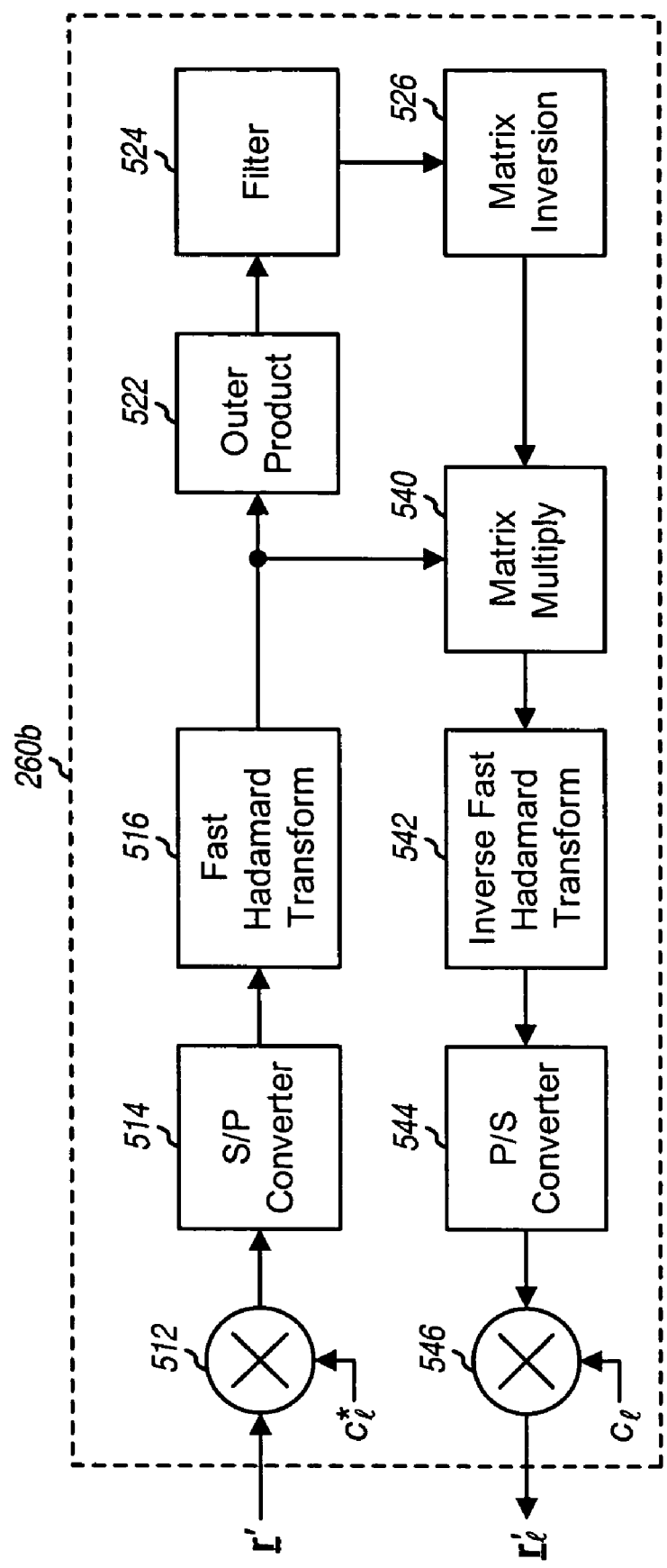
FIG. 5 shows a single-sector interference canceller for multiple signal paths.

FIG. 5 shows a block diagram of a single-sector interference canceller 260b, which is another embodiment of interference canceller 260 in FIG. 2. Interference canceller 260b may be used to suppress interference from multiple signal paths for sector l. These multiple signal paths may be (1) multipaths in a single received signal from a single receive antenna, (2) multiple received signals from multiple receive antennas, or (3) multipaths in multiple received signals.

Within interference canceller 260b, in each chip period, a multiplier 512 receives a vector $\underline{r}'$ containing P received samples for P signal paths, multiplies the received sample in each vector location with the complex-conjugated spreading code $c_l^*$ for sector l, and provides P input samples for P locations in $\underline{r}'$. A serial-to-parallel converter 514 forms an N×P matrix of input samples in each symbol period. This matrix contains P columns for the P signal paths, with each column containing N input samples for one signal path. An FHT unit 516 performs an N-point FHT on each column of the N×P input sample matrix and provides an N×P matrix of received symbols. This received symbol matrix contains P columns for the P signal paths, with each column containing N received symbols for the N Walsh bins in one signal path.

Units 522 through 540 perform matrix-vector multiply of the received symbols on a per Walsh bin basis. Unit 522 forms N vectors with the N rows of the N×P received symbol matrix, with each vector containing P received symbols for the P signal paths for one Walsh bin. Unit 522 then computes an outer product of the received symbol vector for each Walsh bin and provides a P×P correlation matrix for that Walsh bin. Filter 524 filters the N correlation matrices for the N Walsh bins over multiple symbol periods and provides N P×P covariance matrices for the N Walsh bins. A unit 526 inverts each P×P covariance matrix. Multiplier 540 multiplies each row of the N×P received symbol matrix (which is a 1×P row vector for one Walsh bin) with the P×P inverted covariance matrix for that Walsh bin and provides a corresponding 1×P row vector of resultant symbols. Multiplier 540 provides an N×P matrix of resultant symbols in each symbol period.

An IFHT unit 542 performs an N-point IFHT on each column of the N×P scaled symbol matrix and provides an N×P matrix of output samples for that symbol period. A parallel-to-serial converter 544 serializes the N output samples for each symbol path and provides a vector of P output samples for the P signal paths in each chip period. A multiplier 546 multiplies the output samples for each signal path with the spreading code for sector l and provides the interference-canceled sample for that signal path. In each chip period, multiplier 546 provides a vector $\underline{r}'_l$ containing P interference-canceled samples for the P signal paths.

FIGS. 4 and 5 show interference cancellation for one interfering sector l. Interference from multiple sectors may also be estimated and canceled prior to demodulating a desired sector. A cancellation term $\underline{e}_l$ for each sector l may be defined as:

$$\underline{e}_l = \underline{r} - \frac{1}{tr(\underline{\Lambda}_l^{-1})} \cdot \underline{r}_l = \underline{r} - \tilde{\underline{r}}_l, \quad \text{Eq (11)}$$

where $1/tr(\underline{\Lambda}_l^{-1})$ is a scaling factor for sector l; and $\tilde{\underline{r}}_l$ is a scaled version of $\underline{r}_l$.

Vector $\underline{e}_l$ contains the signal component for sector l as well as distortion noise due to the $\sigma^2$ term in equation (6). Vector $\underline{e}_l$ represents an interference component for other sectors and is equal to zero if $\underline{\Lambda}_l$ is equi-diagonal. Vectors $\underline{e}_l$ for different sectors are uncorrelated due to the use of different spreading codes by different sectors. Vector $\underline{e}_l$ for an interfering sector l is also uncorrelated with transmitted vector $\underline{x}_j$ for a desired sector j, again due to the use of different spreading codes. The scaling factor $1/tr(\underline{\Lambda}_l^{-1})$ results in optimal weighting of the interference contributions from different interfering sectors.

An estimate of the transmitted vector $\underline{x}_j$ for sector j may be expressed as:

$$\hat{\underline{x}}_j = \underline{r} - \sum_{l \neq j} \underline{e}_l = \underline{r} - \underline{e}_{os,j},  \quad \text{Eq (12)}$$

where $\hat{\underline{x}}_j$ is an estimate of $\underline{x}_j$ and $\underline{e}_{os,j}$ is the sum of the cancellation signals from the other sectors. Vector $\hat{\underline{x}}_j$ includes the signal component from sector j and has the interference components from other sectors canceled. Equations (11) and (12) maximize the signal-to-noise-and-interference ratio (SINR) for the estimation of $\hat{\underline{x}}_j$ under the assumption that the data symbols from each sector are independent and zero mean. The transmitted vector $\hat{\underline{x}}_j$ may be despread and decovered to obtain data symbol estimates for a desired traffic channel n from sector j, as follows:

$$\hat{s}_{j,n} = \underline{w}_n^T \cdot \underline{C}_j^H \cdot \hat{\underline{x}}_j. \quad \text{Eq (13)}$$

Figure 6:
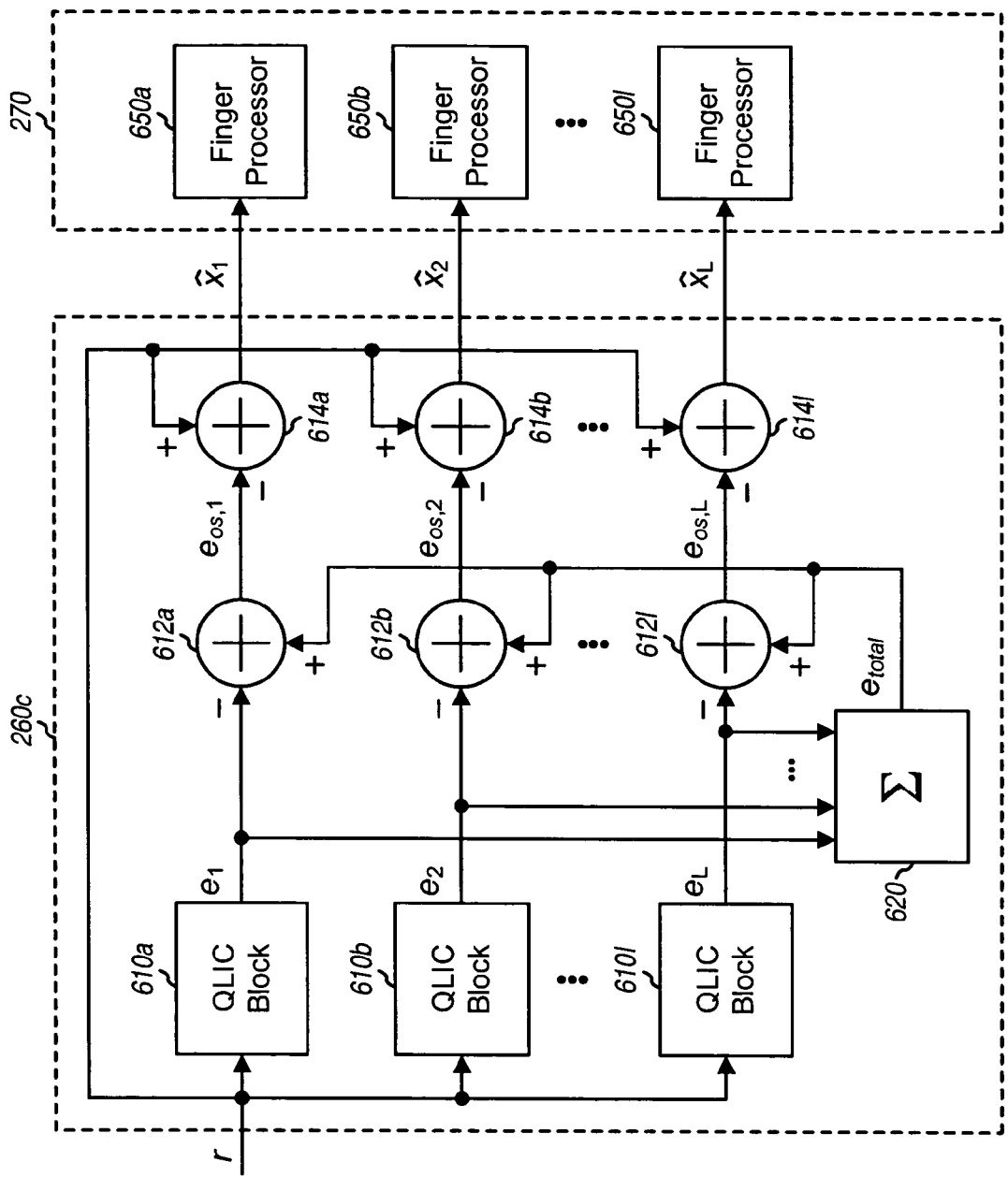
FIG. 6 shows a parallel multi-sector interference canceller.

FIG. 6 shows a block diagram of a parallel multi-sector interference canceller 260c, which is another embodiment of interference canceller 260 in FIG. 2. Interference canceller 260c performs interference cancellation for multiple (L) sectors and provides estimates of the signals transmitted by these L sectors.

Within interference canceller 260c, the received signal r (which corresponds to the received samples from receiver unit 254) is provided to L QLIC blocks 610a through 610l for the L sectors. Each QLIC block 610 derives a cancellation signal for its assigned sector and may be implemented as described below. A combiner 620 additively combines the cancellation signals $e_1$ through $e_L$ for all L sectors and provides a total cancellation signal $e_{total}$. For each sector j, a summer 612 subtracts the cancellation signal $e_j$ for that sector from the total cancellation signal $e_{total}$ and provides an other-sector cancellation signal $e_{os,j}$, which corresponds to the term $$\sum_{l \neq j} \underline{e}_l$$

in equation (12). For each sector j, a summer 614 subtracts the other-sector cancellation signal $e_{os,j}$ for that sector from the received signal r to obtain a signal estimate $\hat{x}_j$ for that sector. The signal estimate $\hat{x}_j$ for each sector has the cancellation signals from the other L−1 sectors removed. Summers 614a through 614l provide the signal estimates $\hat{x}_1$ through $\hat{x}_L$ for the L sectors to L finger processors 650a through 650l, respectively, within rake receiver 270. Each finger processor 650 may perform demodulation as shown in equation (13) for its assigned sector.

FIG. 6 shows an embodiment of interference cancellation for multiple sectors in parallel. The cancellation signals for the L sectors are derived in parallel based on the received signal r. The accuracy of the cancellation signal for each sector is affected by the interference from all other sectors. The signal estimate $\hat{x}_j$ for each sector is then derived based on the cancellation signal $e_j$ for that sector, the total cancellation signal $e_{total}$ for all L sectors, and the received signal r.

Interference cancellation for multiple sectors may also be performed in a successive manner, i.e., a sequential or cascaded manner. Successive interference cancellation for L sectors may be performed in L successive stages, with the interference from one sector being canceled in each stage. The interference cancellation at each stage may be performed based on the output from a preceding stage, which may have the interference from all prior stages removed and may thus be "cleaner" than the received signal. Successive interference cancellation may improve performance. For example, if different sectors cause different amounts of interference, then interference cancellation may first be performed for a strong sector to suppress the signal component from this sector, and then performed for a weaker sector. The interference cancellation for the weaker sector may improve because the signal contribution from the strong sector has been attenuated. The cancellation of the strong sector reduces the a 2 term in equation (6) for the weaker sector, which makes the gain matrix for the weaker sector more prominent and improves the characteristics of $\underline{\Lambda}_l$ for the weaker sector. Hence, cancellation of the strong sector allows for better interference cancellation of the weaker sector.

Figure 7A:
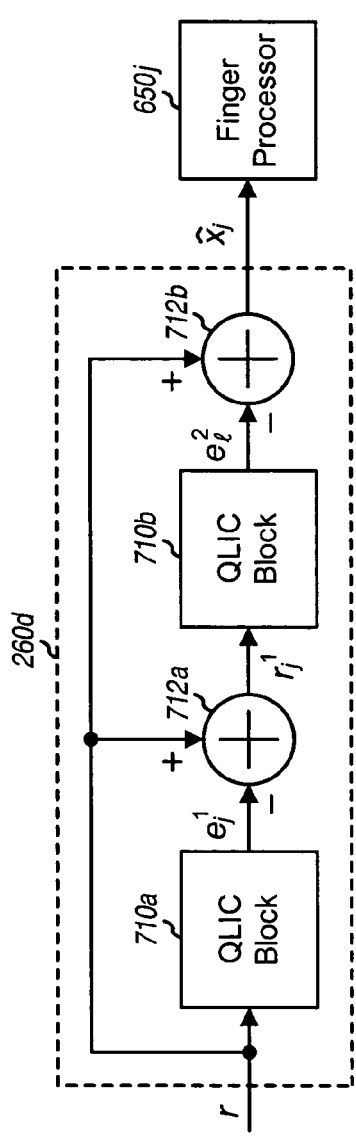
FIG. 7A shows a cascaded two-sector interference canceller.

FIG. 7A shows a block diagram of a cascaded two-sector interference canceller 260d, which is yet another embodiment of interference canceller 260 in FIG. 2. For this embodiment, the signal component for a desired sector j is first canceled, and the interference from an interfering sector l is then canceled to generate a signal estimate for the desired sector.

Within interference canceller 260d, the received signal r is provided to a QLIC block 710a, which derives a cancellation signal $e_j^1$ for the desired sector j. The superscript '1' in $e_j^1$ is for the stage number, and the subscript j is for the sector being processed by the stage. A summer 712a subtracts the cancellation signal $e_j^1$ from the received signal r and provides an intermediate signal $r_j^1$ having the signal component and distortion noise for the desired sector suppressed. A QLIC block 710b receives the intermediate signal $r_j^1$ and derives a cancellation signal $e_l^2$ for the interfering sector l. A summer 712b subtracts the cancellation signal $e_l^2$ from the received signal r and provides a signal estimate $\hat{x}_j$ containing the signal component for the desired sector but having the interference from the interfering sector suppressed. A finger processor 650j within rake receiver 270 performs demodulation on the signal estimate $\hat{x}_j$ for the desired sector j.

Figure 7B:
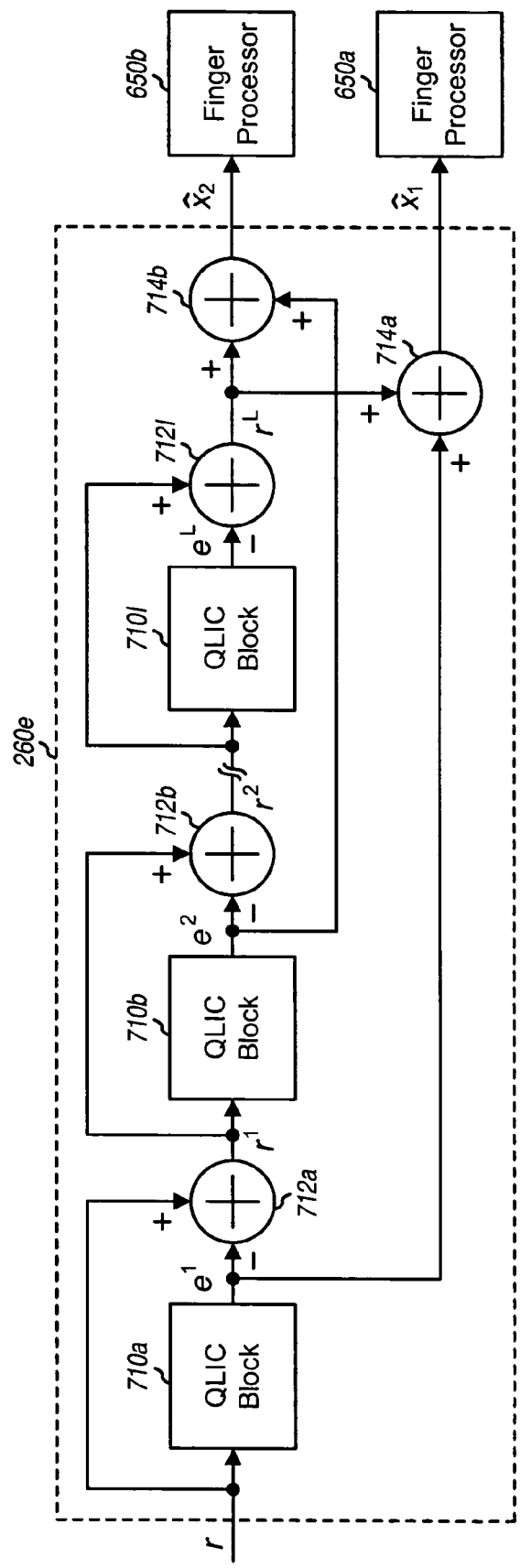
FIG. 7B shows a cascaded multi-sector interference canceller.

FIG. 7B shows a block diagram of a cascaded multi-sector interference canceller 260e, which is yet another embodiment of interference canceller 260 in FIG. 2. For this embodiment, the signal components for L sectors are successively suppressed in L stages.

Within interference canceller 260e, the received signal r is provided to QLIC block 710a, which derives a cancellation signal $e^1$ for the first sector. Summer 712a subtracts the cancellation signal $e^1$ from the received signal r and provides an intermediate signal $r^1$ having the signal component for the first sector suppressed. QLIC block 710b receives the intermediate signal $r^1$ and derives a cancellation signal $e^2$ for the second sector. A summer 712b subtracts the cancellation signal $e^2$ from the intermediate signal $r^1$ and provides an intermediate signal $r^2$ having the signal components for both the first and second sectors suppressed.

Each subsequent stage i operates in similar manner as stage 2. QLIC block 710 for stage i receives the intermediate signal $r^{i-1}$ from prior stage i−1 and derives a cancellation signal $e^i$ for sector i assigned to stage i. Summer 712 for stage i subtracts the cancellation signal $e^i$ from the intermediate signal $r^{i-1}$ generated by the prior stage and provides to the next stage an intermediate signal $r^i$ having the signal components for all sectors assigned to the current and prior stages suppressed.

Summer 712l for the last stage provides an intermediate signal $r^L$ having the signal components from all L sectors suppressed. A summer 714a adds the cancellation signal $e^1$ for the first sector with the intermediate signal $r^L$ and provides a signal estimate $\hat{x}_1$ for the first sector. A summer 714b adds the cancellation signal $e^2$ for the second sector with the intermediate signal $r^L$ and provides a signal estimate $\hat{x}_2$ for the second sector. Additional adders may be used to generate signal estimates for other sectors.

In an embodiment, the sectors are assigned to the stages based on their signal strength. For example, the strongest received sector may be assigned to stage 1, the next strongest received sector may be assigned to stage 2, and so on. In another embodiment, the sector with the earliest arriving signal may be assigned to stage 1, the sector with the next arriving signal may be assigned to stage 2, and so on. The sectors may also be assigned to the stages in other manners.

Figure 8:
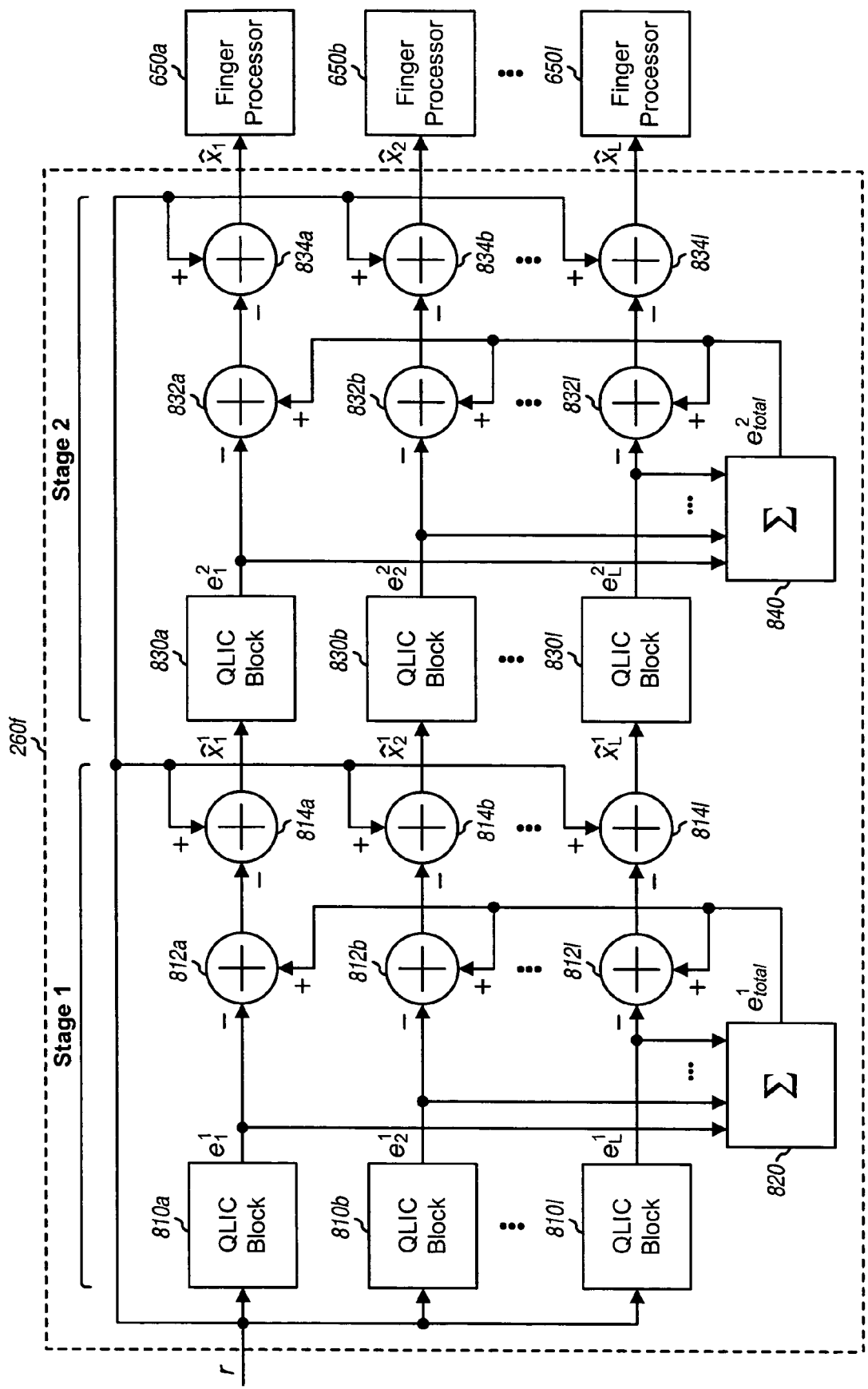
FIG. 8 shows a parallel two-stage interference canceller.

FIG. 8 shows a block diagram of a parallel two-stage interference canceller 260f, which is yet another embodiment of interference canceller 260 in FIG. 2. Interference canceller 260f is a combination of interference canceller 260c in FIG. 6 and interference canceller 260d in FIG. 7A.

For the first stage, the received signal r is provided to L QLIC blocks 810a through 810l for L sectors. Each QLIC block 810 derives a cancellation signal for its assigned sector based on the received signal. A combiner 820 additively combines the cancellation signals $e_1^1$ through $e_L^1$ from all L QLIC blocks 810a through 810l and provides a total cancellation signal $e_{total}^1$ for the first stage. For each sector j, a summer 812 subtracts the cancellation signal $e_j^1$ for that sector from the total cancellation signal $e_{total}^1$ and provides an other-sector cancellation signal $e_{os,j}^1$ for that sector. For each sector j, a summer 814 subtracts the other-sector cancellation signal $e_{os,j}^1$ from the received signal r and provides an initial signal estimate $\hat{x}_j^1$ for that sector. The initial signal estimate for each sector has the cancellation signals from the other L−1 sectors removed. Summers 814a through 814l provide the initial signal estimates $\hat{x}_1^1$ through $\hat{x}_L^1$ for the L sectors.

For the second stage, QLIC blocks 830a through 830l receive the initial signal estimates $\hat{x}_1^1$ through $\hat{x}_L^1$ from summers 814a through 814l, respectively. Each QLIC block 830 derives a cancellation signal $e_j^2$ for its assigned sector j based on its initial signal estimate $\hat{x}_j^1$. For each sector j, the cancellation signal $e_j^2$ from the second stage is typically a better estimate of the signal component for sector j than the cancellation signal $e_j^1$ from the first stage because $e_j^2$ is derived based on the initial signal estimate $\hat{x}_j^1$ having the interference from the other L−1 sectors suppressed. A combiner 840 additively combines the cancellation signals $e_1^2$ through $e_L^2$ from all L QLIC blocks 830a through 830l and provides a total cancellation signal $e_{total}^2$ for the second stage. For each sector j, a summer 832 subtracts the cancellation signal $e_j^2$ for that sector from the total cancellation signal $e_{total}^2$ and provides an other-sector cancellation signal $e_{os,j}^2$ for the sector. For each sector j, a summer 834 subtracts the other-sector cancellation signal $e_{os,j}^2$ from the received signal r and provides a final signal estimate $\hat{x}_j$ for that sector. The final signal estimate $\hat{x}_j$ for each sector has the signal components from the other L−1 sectors suppressed. Summers 834a through 834l provide the final signal estimates $\hat{x}_1$ through $\hat{x}_L$ for the L sectors to L finger processors 650a through 650l, respectively, within rake receiver 270.

FIGS. 6 through 8 show some exemplary interference cancellers that perform interference cancellation for one or multiple sectors. Each QLIC block in FIGS. 6 through 8 may derive a cancellation signal for one signal path of one sector (per path processing), multiple signal paths of one sector (per sector processing), or multiple signal paths of multiple sectors (multi-sector processing). The multiple signal paths processed by a given QLIC block may be for one or multiple receive antennas. Other interference cancellers may also be designed based on the description provided herein. For example, the embodiment shown in FIG. 8 may be extended to include more than two cascaded interference cancellation stages.

Figure 9A:
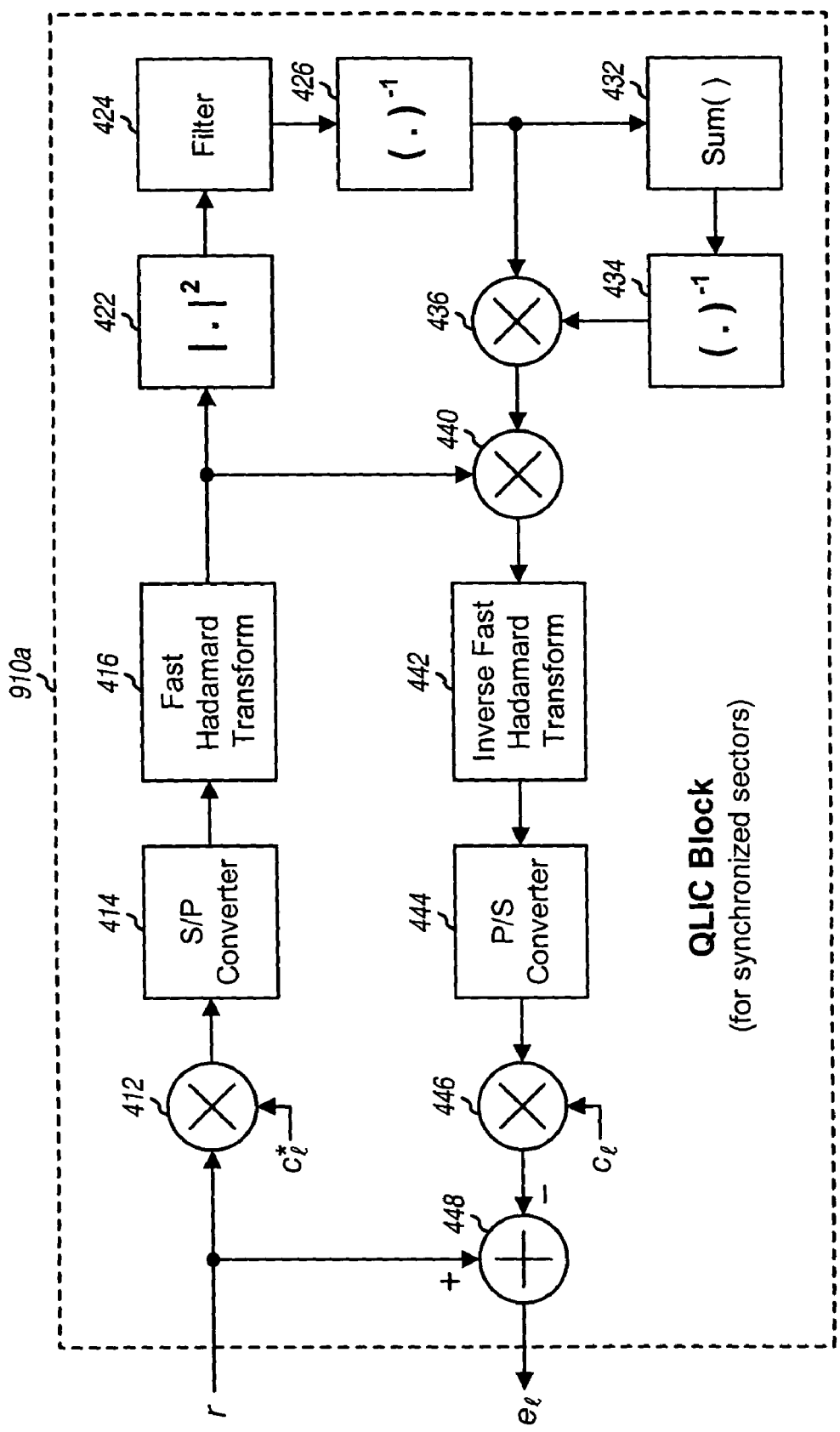
FIGS. 9A through 9D show four embodiments of a quasi-linear interference cancellation (QLIC) block.

FIG. 9A shows a block diagram of a QLIC block 910a, which may be used for each QLIC block in interference cancellers 260c through 260f shown in FIGS. 6 through 8. QLIC block 910a receives incoming samples and generates samples for a cancellation signal $e_l$ for one sector l. For clarity, FIG. 9A shows QLIC block 910a being used for the first stage, so that the incoming samples are the received samples for the received signal r. QLIC block 910a does not perform resampling of the incoming samples and may be used in multi-sector interference cancellers 260c through 260f if the sectors are synchronized and the signals from these sectors are received at the wireless device aligned in time.

Within QLIC block 910a, multiplier 412, serial-to-parallel converter 414, FHT unit 416, squared magnitude unit 422, filter 424, and inverse unit 426 operate as described above for FIG. 4. Inverse unit 426 provides N inverse power estimates, which are estimates of the diagonal elements of $\underline{\Lambda}_l^{-1}$. A summer 432 sums the N inverse power estimates and computes the trace of $\underline{\Lambda}_l^{-1}$. A unit 434 computes the inverse of the trace of $\underline{\Lambda}_l^{-1}$ and provides the scaling factor $1/\mathrm{tr}(\underline{\Lambda}_l^{-1})$. A multiplier 436 multiplies each of the N inverse power estimates from unit 426 with the scaling factor $1/\mathrm{tr}(\underline{\Lambda}_l^{-1})$. Multiplier 436 may also be located after multiplier 446, as indicated by equation (11). IFHT unit 442, parallel-to-serial converter 444, and multiplier 446 operate as described above for FIG. 4. Multiplier 446 provides interference-canceled samples having the signal component and distortion noise for sector l attenuated based on the inverse covariance matrix $\underline{\Lambda}_l^{-1}$. A summer 448 subtracts the interference-canceled samples from the received samples and provides the cancellation samples $e_l$ for sector l.

For the embodiment shown in FIG. 9A, the received samples r are temporarily stored until the corresponding samples from multiplier 446 are available. In another embodiment, summer 448 is located between multiplier 440 and IFHT unit 442, and appropriate scaling is performed to accommodate this move of summer 448. For this embodiment, summer 448 subtracts the output of multiplier 440 from the output of FHT unit 416 and provides its output to IFHT unit 442. This embodiment ameliorates the need to store the received samples and reduces buffering requirement.

Figure 9B:
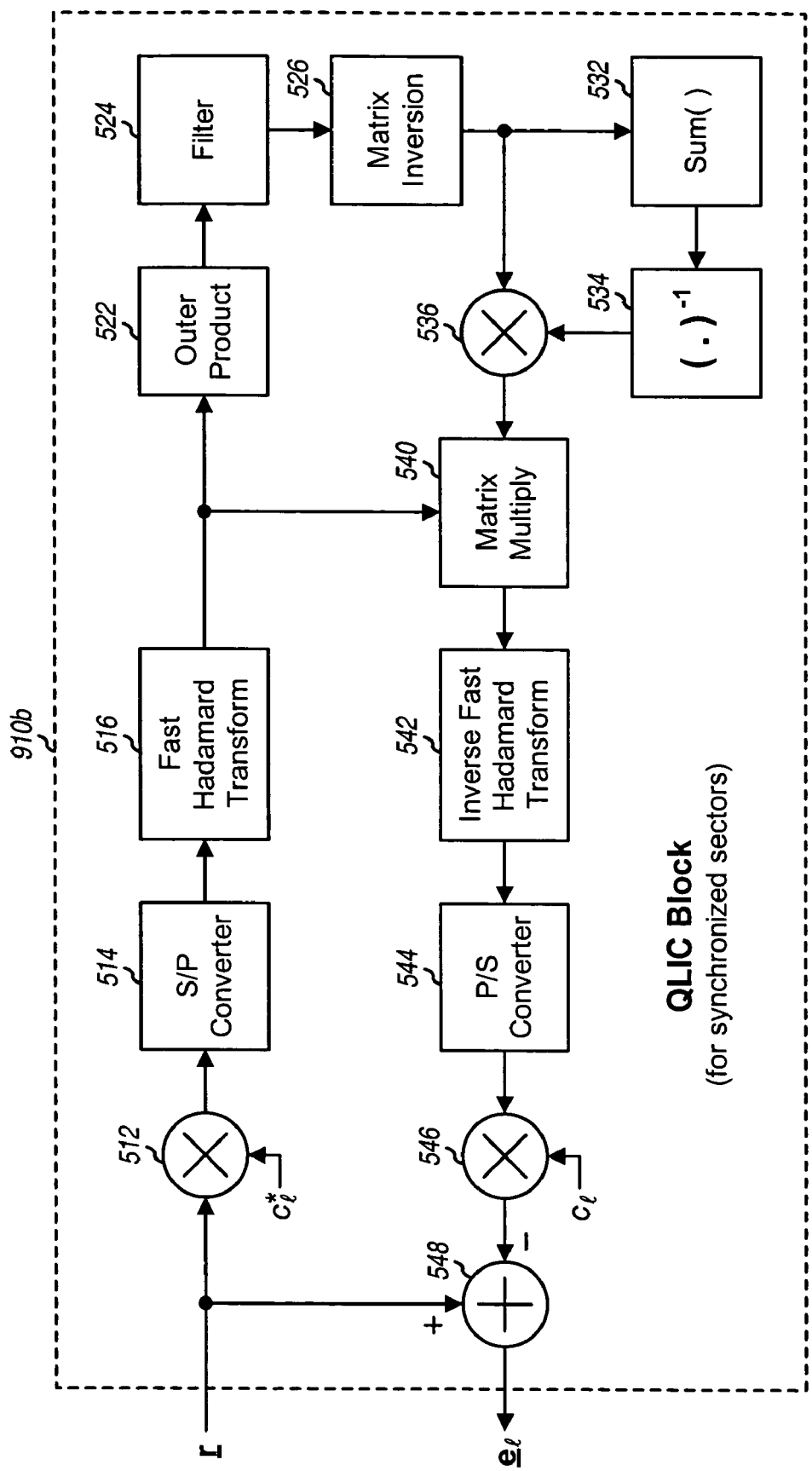

FIG. 9B shows a block diagram of a QLIC block 910b, which may also be used for each QLIC block in interference cancellers 260c through 260f. QLIC block 910b generates samples for a cancellation signal $e_l$ for one sector l based on the received samples. QLIC block 910b includes units 512 through 526 and units 540 through 546 that operate as described above for FIG. 5. Unit 526 provides an estimate of $\underline{\Lambda}_l^{-1}$ for each Walsh bin. QLIC block 910b further includes units 532, 534 and 536 that compute the proper weight for sector l. For each symbol period, unit 532 sums the estimates of $\underline{\Lambda}_l^{-1}$ for all N Walsh bins and provides an intermediate matrix. Unit 534 computes an inverse of the intermediate matrix and provides an intermediate matrix for sector l. Multiplier 536 multiplies the estimate of $\underline{\Lambda}_l^{-1}$ for each Walsh bin with the intermediate matrix and provides a gain matrix for that Walsh bin. The multiplication by multiplier 536 may also be moved, e.g., either before or after multiplier 546. Multiplier 540 multiplies the vector of received symbols for each Walsh bin with the gain matrix for that Walsh bin and provides a corresponding vector of resultant symbols.

Figure 9C:
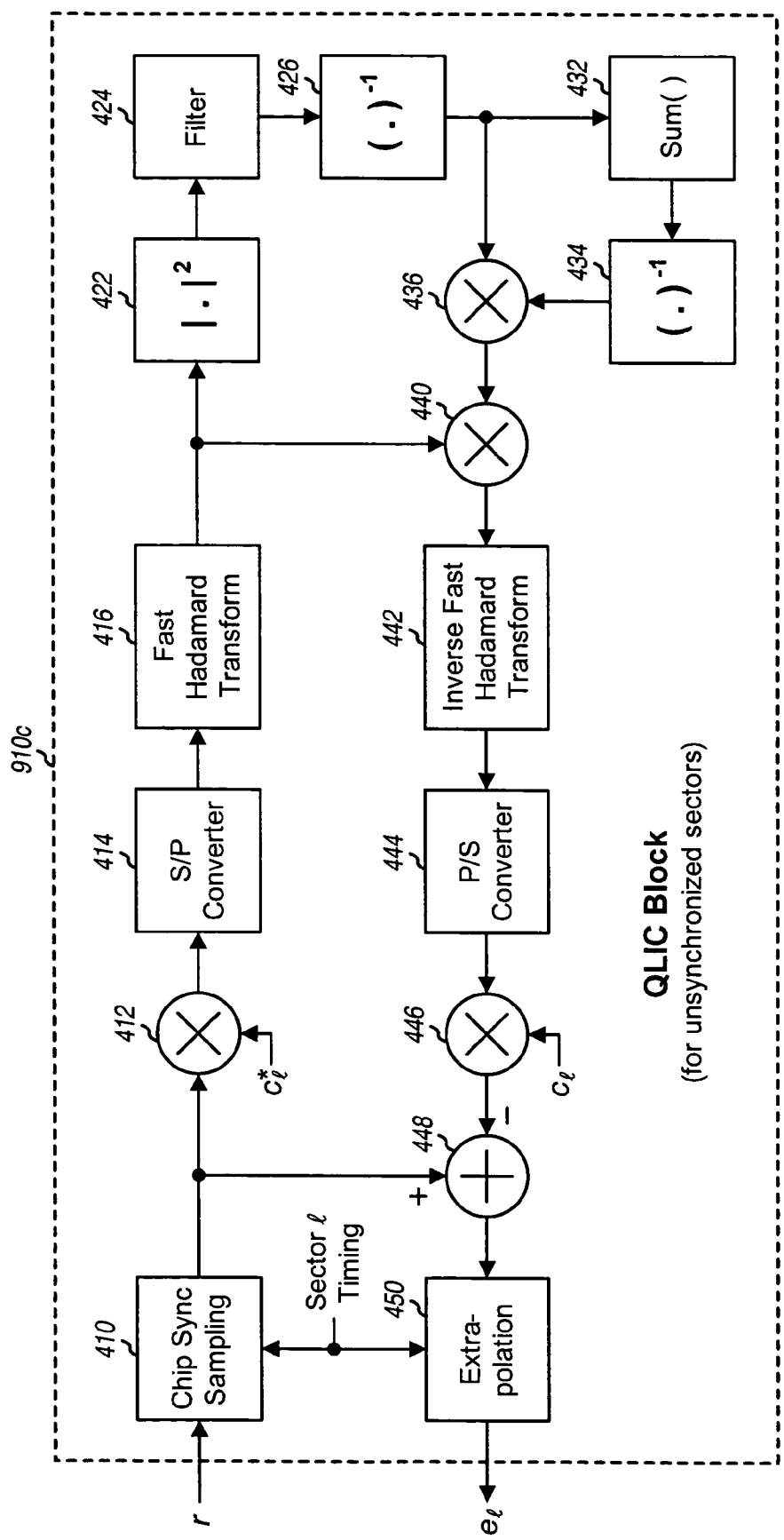

FIG. 9C shows a block diagram of a QLIC block 910c, which may also be used for each QLIC block in interference cancellers 260c through 260f. QLIC block 910c generates samples for a cancellation signal $e_l$ for one sector l based on the received samples. QLIC block 910c performs resampling of the received samples to the proper chip timing and may be used in multi-sector interference cancellers 260c through 260f even if the sectors are unsynchronized and the signals from these sectors are received at the wireless device not aligned in time.

Within QLIC block 910c, a unit 410 performs resampling (e.g., interpolation) on the received samples based on the timing of sector l to synchronize with chip timing. For example, unit 410 may obtain the received samples at twice the chip rate (or chip×2) and may generate interpolated samples at chip rate (or chip×1) and with the timing of sector l. The timing of sector l may be ascertained based on a pilot received from sector l and may be tracked with a time tracking loop, as is known in the art. Units 412 through 448 process the interpolated samples as described above for FIGS. 4 and 9A. Summer 448 provides samples that are aligned with the timing of sector l. An extrapolation unit 450 performs extrapolation on the samples from summer 448 and provides cancellation samples at the same rate and with the same timing as the received samples.

In FIGS. 6 through 8, each QLIC block may operate based on the timing of the sector assigned to that QLIC block. The extrapolation by unit 450 aligns the timing of the cancellation samples for all sectors so that these samples can be additively combined by combiners 620, 820 and 840.

Figure 9D:
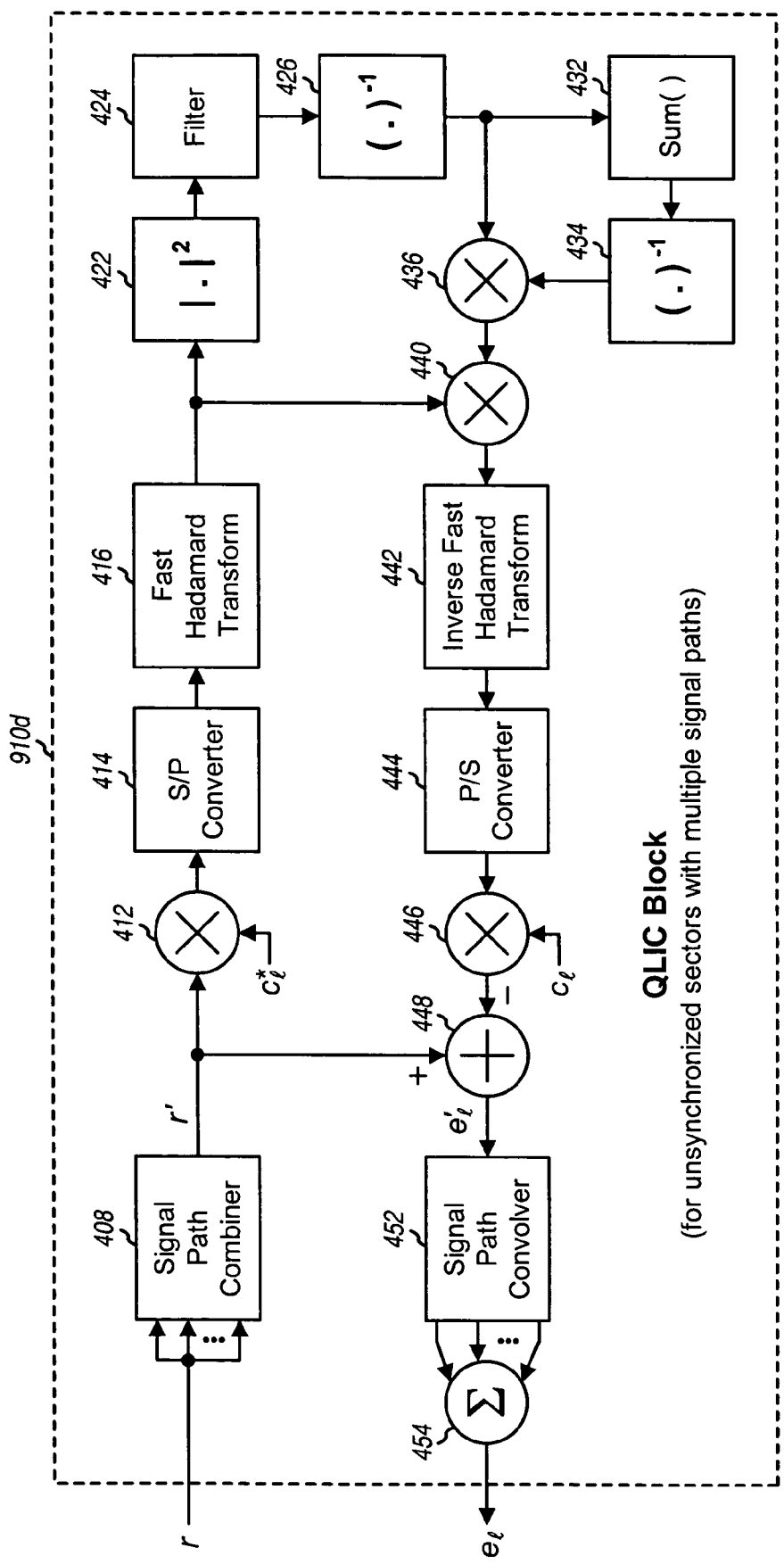

FIG. 9D shows a block diagram of a QLIC block 910d, which may also be used for each QLIC block in interference cancellers 260c through 260f. QLIC block 910d generates samples for a cancellation signal $e_l$ for one sector l based on the received samples. QLIC block 910d can process multiple signal paths for sector l. These multiple signal paths may be multipaths for one receive antenna or multiple signal paths for multiple receive antennas.

QLIC block 910d includes units 412 through 448 that operate as described above for FIGS. 4 and 9A. QLIC block 910d further includes a signal path combiner 408 and a signal path convolver 452. Signal path combiner 408 performs additive weighted combining of the signal paths for sector l, e.g., to maximize the SINR of this sector. Signal path combiner 408 may be implemented with an equalizer, a pilot-weighted combiner, and so on. Signal path convolver 452 performs impulse response shaping to match the effective impulse response of sector l. The output from summer 448 is an estimate of the signal component for sector l. Signal path convolver 452 models the wireless channel between sector l and the wireless device. The outputs of signal path convolver 452 are cancellation signals for the individual signal paths of sector l. A combiner 454 combines the cancellation signals for all signal paths of sector l and provides the cancellation signal for sector l, which is an estimate of the interference observed at the wireless device from sector l.

Figure 10B:
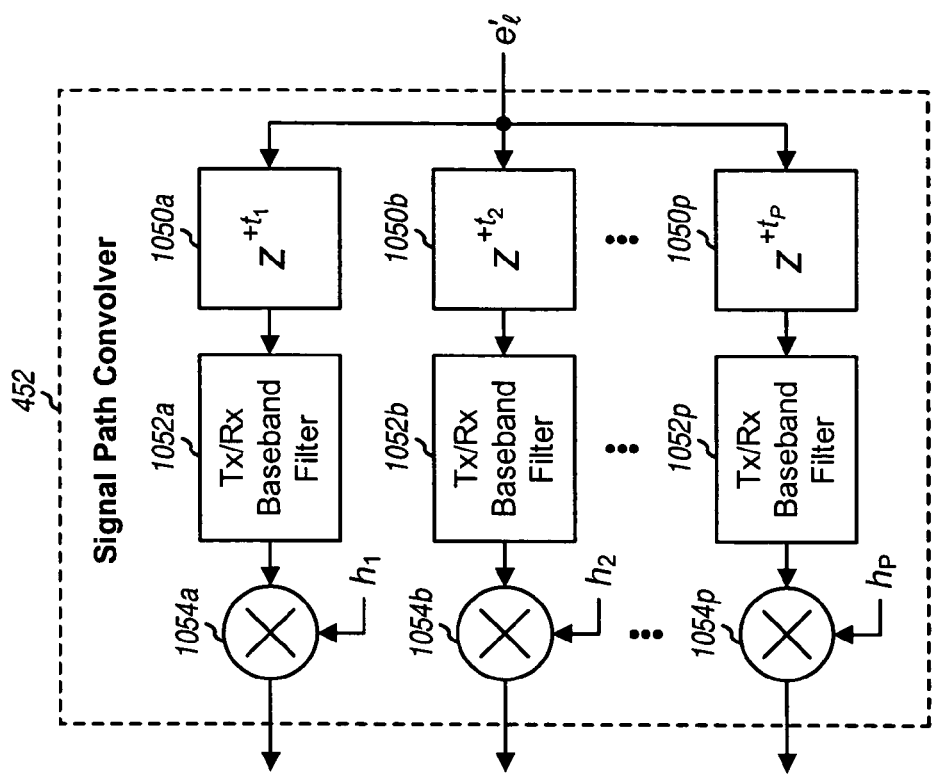
FIG. 10B shows a signal path convolver.
Figure 10A:
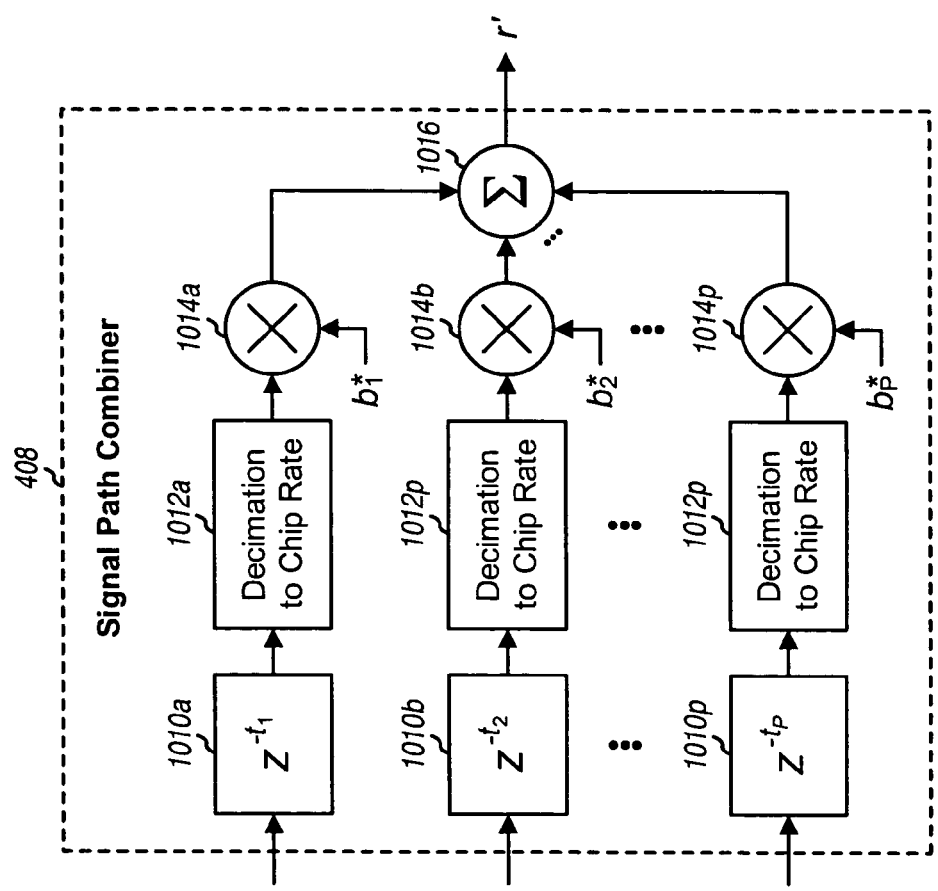
FIG. 10A shows a signal path combiner.

FIG. 10A shows a block diagram of an embodiment of signal path combiner 408 in FIG. 9D. The received samples r are provided to P delay elements 1010a through 1010p for P signal paths for sector l, where P≧1. The signal paths may be identified by a searcher within rake receiver 270 based on a pilot received from sector l, as is known in the art. The timing and received signal quality for each signal path may also be ascertained based on the received pilot. Each delay element 1010 delays the received samples by the delay $t_p$ for its assigned signal path. The delayed samples from all P delay elements 1010a through 1010p are aligned in time. Units 1012a through 1012p receive the delayed samples from delay elements 1010a through 1010p, respectively, and decimate these delayed samples to obtain decimated samples at chip rate. Multipliers 1014a through 1014p receive the decimated samples from units 1012a through 1012p, respectively, and the conjugated weights $b^*_1$ through $b^*_P$, respectively, for the P signal paths. The weight for each signal path may be derived based on the channel gain, received signal strength, received signal quality, or some other metric for that signal path. Each multiplier 1014 scales the decimated samples for its assigned signal path with the weight for that signal path and provides scaled samples. A combiner 1016 combines the scaled samples for all P signal paths and provides composite samples r' for sector l.

FIG. 10B shows a block diagram of an embodiment of signal path convolver 452. The samples from summer 448 in FIG. 9D are provided to P delay elements 1050a through 1050p for the P signal paths of sector l. Each delay element 1050 advances its samples by the delay of its assigned signal path. The delayed samples from all P delay elements 1050a through 1050p are aligned with the timing of the P signal paths. Filters 1052a through 1052p receive the delayed samples from delay elements 1050a through 1050p, respectively, and filter the delayed samples with the combined baseband filter response for the transmit and receive sides. Multipliers 1054a through 1054p receive the filtered samples from filters 1052a through 1052p, respectively, and the channel gains $h_1$ through $h_P$, respectively, for the P signal paths. The channel gain for each signal path may be estimated based on the received pilot. Each multiplier 1054 scales the filtered samples for its assigned signal path with the channel gain for that signal path and provides cancellation samples for that signal path. Multipliers 1054a through 1054p provide P cancellation signals for the P signal paths of sector l.

For interference cancellers 260c, 260d, 260e and 260f in FIGS. 6, 7A, 7B and 8, respectively, each processing path from the received signal r to a finger processor 650 may be for a sector or a signal path of a sector. The processing paths may also be formed in other manners.

Figure 11:
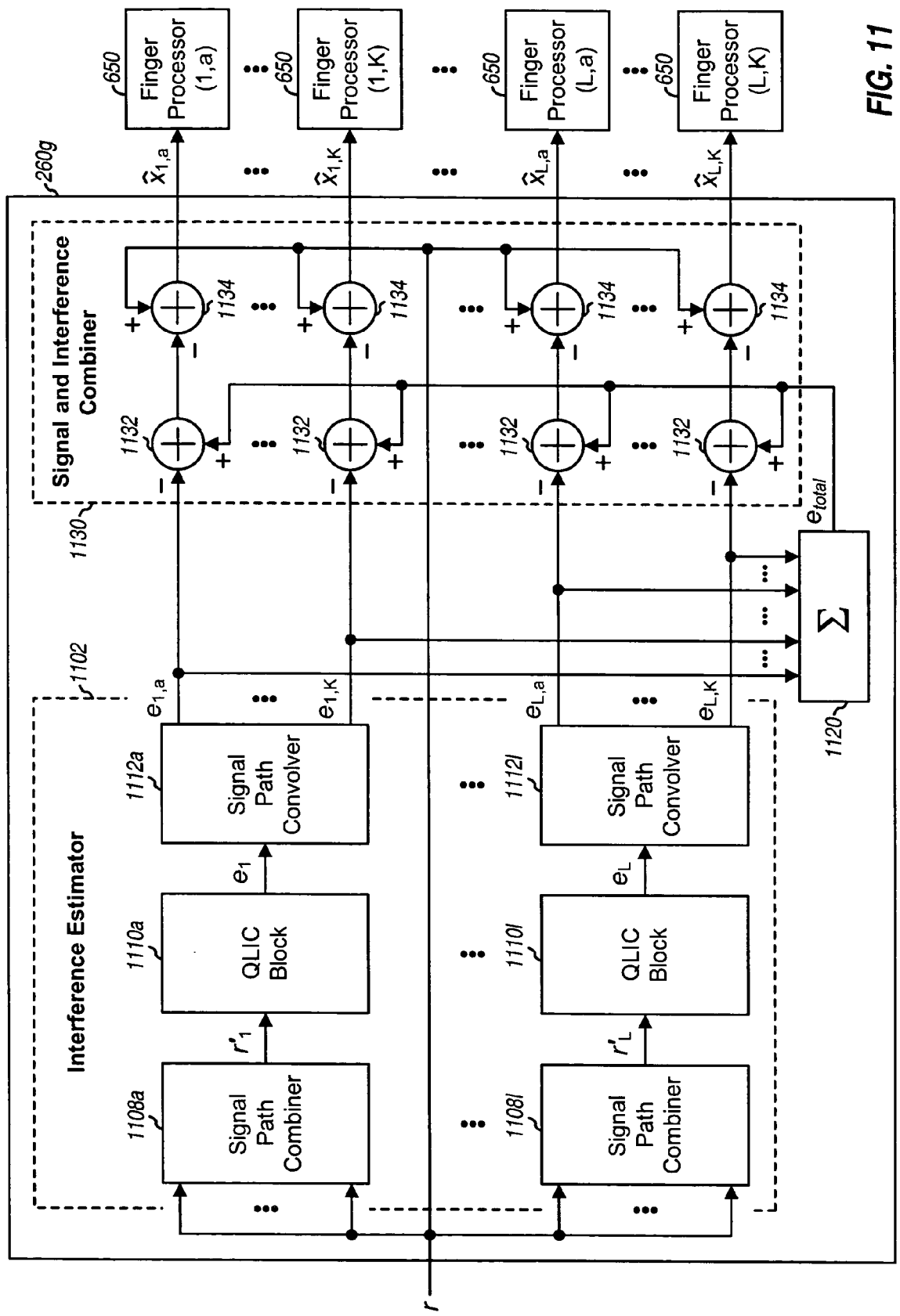
FIG. 11 shows an interference canceller with processing per signal path.

FIG. 11 shows a block diagram of an interference canceller 260g, which is yet another embodiment of interference canceller 260 in FIG. 2. Interference canceller 260g derives a cancellation signal for each sector but performs interference cancellation for the individual signal paths of each sector.

Canceller 260g includes an interference estimator 1102, a combiner 1120, and a signal and interference combiner 1130. Within interference estimator 1102, the received signal r is provided to L signal path combiners 1108a through 1108l for L sectors. Each signal path combiner 1108 performs additive weighted combining of the signal paths for its assigned sector and provides a composite signal for that sector. Each signal path combiner 1108 may be implemented with signal path combiner 408 in FIG. 10A or with some other design. Signal path combiners 1108a through 1108l may process the same number of (K) signal paths (as shown in FIG. 11) or different numbers of signal paths. Signal path combiners 1108a through 1108l provide L composite signals $r'^1$ through $r'_L$ for the L sectors to L QLIC blocks 1110a through 1110l, respectively. Each QLIC block 1110 derives a cancellation signal for its assigned sector based on its composite signal. Each QLIC block 1110 may be implemented with QLIC block 910a, 910b or 910c or with some other QLIC design. QLIC blocks 1110a through 1110l provide L cancellation signals $e_1$ through $e_L$ for the L sectors to L signal path convolvers 1112a through 1112l, respectively. Each signal path convolver 1112 performs impulse response shaping on the cancellation signal for its assigned sector and provides cancellation signals for the signal paths of that sector. Each signal path convolver 1112 may be implemented with signal path convolver 452 in FIG. 10B or with some other design. A combiner 1120 additively combines the cancellation signals for all signal paths of all L sectors from all L signal path convolvers 1112a through 1112l and provides a total cancellation signal $e_{total}$.

Signal and interference combiner 1130 includes a pair of summers 1132 and 1134 for each signal path of each sector. For each signal path k of each sector j, a summer 1132 subtracts the cancellation signal $e_{j,k}$ for that sector from the total cancellation signal $e_{total}$ and provides an other-sector cancellation signal $e_{os,j,k}$. For each signal path k of each sector j, a summer 1134 subtracts the other-sector cancellation signal $e_{os,j,k}$ from the received signal r and provides a signal estimate $\hat{x}_{j,k}$ for signal path k of sector j. Each signal estimate is processed by a respective finger processor 650 within rake receiver 270.

Figure 12:
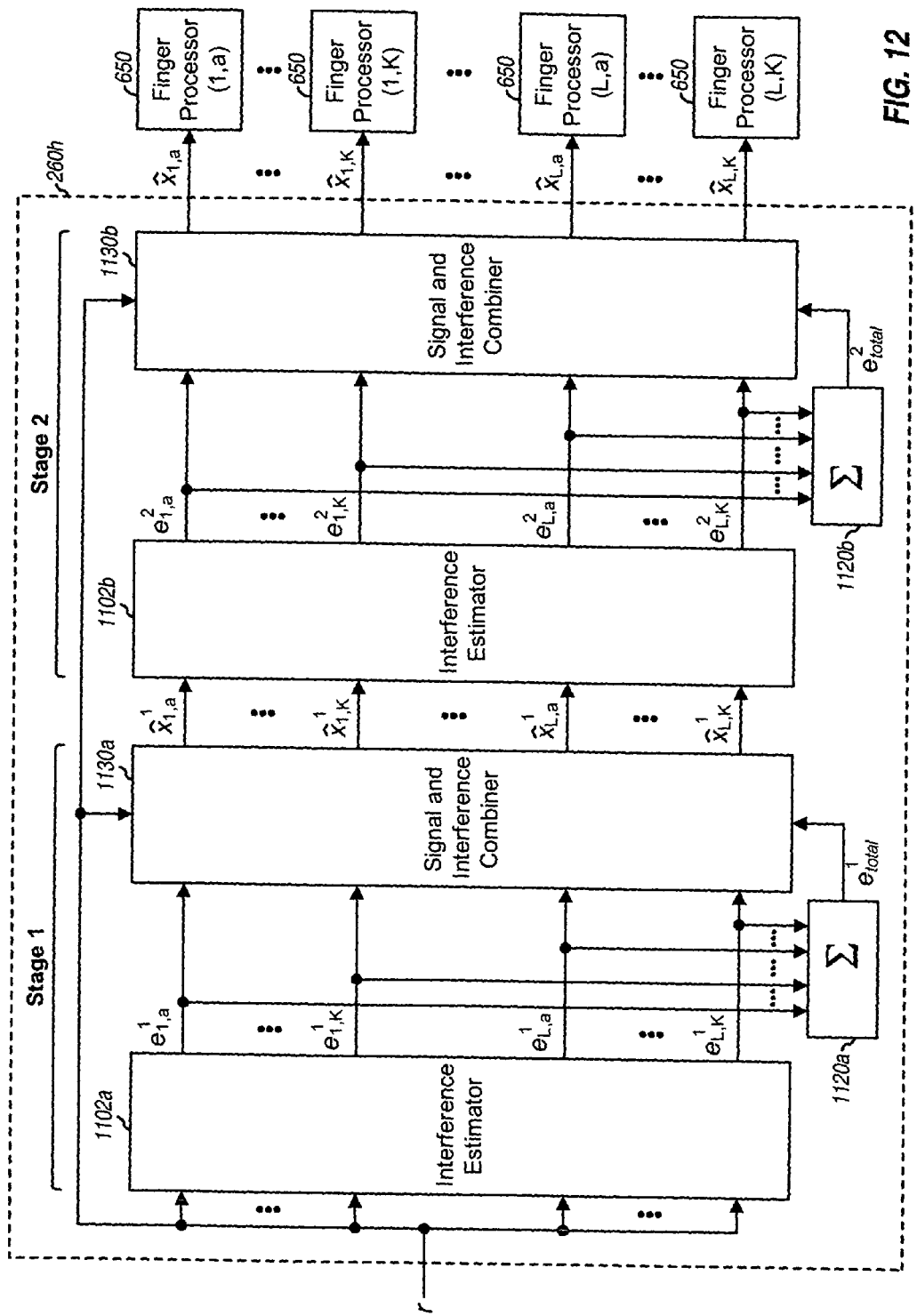
FIG. 12 shows a two-stage interference canceller with processing per signal path.

FIG. 12 shows a block diagram of a two-stage interference canceller 260h, which is yet another embodiment of interference canceller 260 in FIG. 2. Interference canceller 260h includes two stages. Each stage derives a cancellation signal for each sector but performs interference cancellation for individual signal paths of each sector.

For the first stage, the received signal r is provided to an interference estimator 1102a, which may be implemented with interference estimator 1102 in FIG. 11. Interference estimator 1102a derives cancellation signals for the signal paths of the L sectors. A combiner 1120a additively combines the cancellation signals for the signal paths of all L sectors from interference estimator 1102a and provides a total cancellation signal $e_{total}^1$ for the first stage. A signal and interference combiner 1130a, which may be implemented with signal and interference combiner 1130 in FIG. 11, derives initial signal estimates for the signal paths of all L sectors based on the received signal r, the cancellation signals from interference estimator 1102a, and the total cancellation signal $e_{total}^1$ from combiner 1120a.

For the second stage, the initial signal estimates for the signal paths of all L sectors are provided to an interference estimator 1102b, which may also be implemented with interference estimator 1102 in FIG. 11. Interference estimator 1102b derives cancellation signals for the signal paths of the L sectors. The cancellation signals from the second stage are derived based on the initial signal estimates having the interference from the other sectors suppressed and are thus typically better estimates than the cancellation signals from the first stage. A combiner 1120b additively combines the cancellation signals for the signal paths of all L sectors from interference estimator 1102b and provides a total cancellation signal $e_{total}^2$ for the second stage. A signal and interference combiner 1130b derives final signal estimates for the signal paths of all L sectors based on the received signal r, the cancellation signals from interference estimator 1102b, and the total cancellation signal $e_{total}^2$ from combiner 1120b.

For the embodiments shown in FIGS. 11 and 12, a cancellation signal is derived for each sector but the interference cancellation is performed for individual signal paths of each sector. Each processing path from the received signal r to a finger processor 650 in FIGS. 11 and 12 is for one signal path of one sector. However, the processing paths for all signal paths of each sector share the same QLIC block(s). The interference cancellation may also be performed in other manners.

For the embodiments shown in FIGS. 4, 5, and 9A through 9D, the size of the FHT and IFHT is determined by the longest Walsh code used for transmission, which may be 128 chips for cdma2000 and 512 chips for W-CDMA. The pilot may be transmitted with Walsh code 0 and using either fixed modulation or no modulation. In this case, the pilot Walsh code is theoretically infinite in duration. The pilot channel may be processed as a longer Walsh code (e.g., 4N) to improve the quality of the pilot estimate.

In an embodiment, the pilot processing may be performed as follows. For each symbol period m, an N-point FHT is performed on N input samples for symbol period m to obtain N received symbols for the N Walsh codes. Four received symbols obtained for the pilot Walsh code in four symbol periods, e.g., the current symbol period m and the three most recent symbol periods m−1, m−2 and m−3, may be transformed with a 4-point FHT to obtain four decovered symbols for four Walsh sub-bins of the pilot Walsh code. One Walsh sub-bin is for the pilot and the other three Walsh sub-bins are noise. N−1 received symbols obtained for the N−1 non-pilot Walsh codes in the current symbol period m and the four decovered symbols for the four pilot Walsh sub-bins (or a total of N+3 symbols) are then processed, e.g., by blocks 422, 424, 426 and 440 in FIG. 4, to obtain N+3 scaled symbols. A 4-point IFHT is then performed on the four scaled symbols for the four pilot Walsh sub-bins to obtain four covered symbols. The covered symbol for the Walsh sub-bin for the pilot is provided as the scaled symbol for the pilot Walsh code, and the covered symbols for the other three Walsh sub-bins are discarded. N scaled symbols for the N Walsh codes are then processed, e.g., by blocks 442, 444 and 446 in FIG. 4, to obtain the interference-canceled samples for the current symbol period m. The decovered symbol for the pilot Walsh sub-bin has a higher SNR due to the extra averaging, which may improve the interference cancellation.

Figure 13:
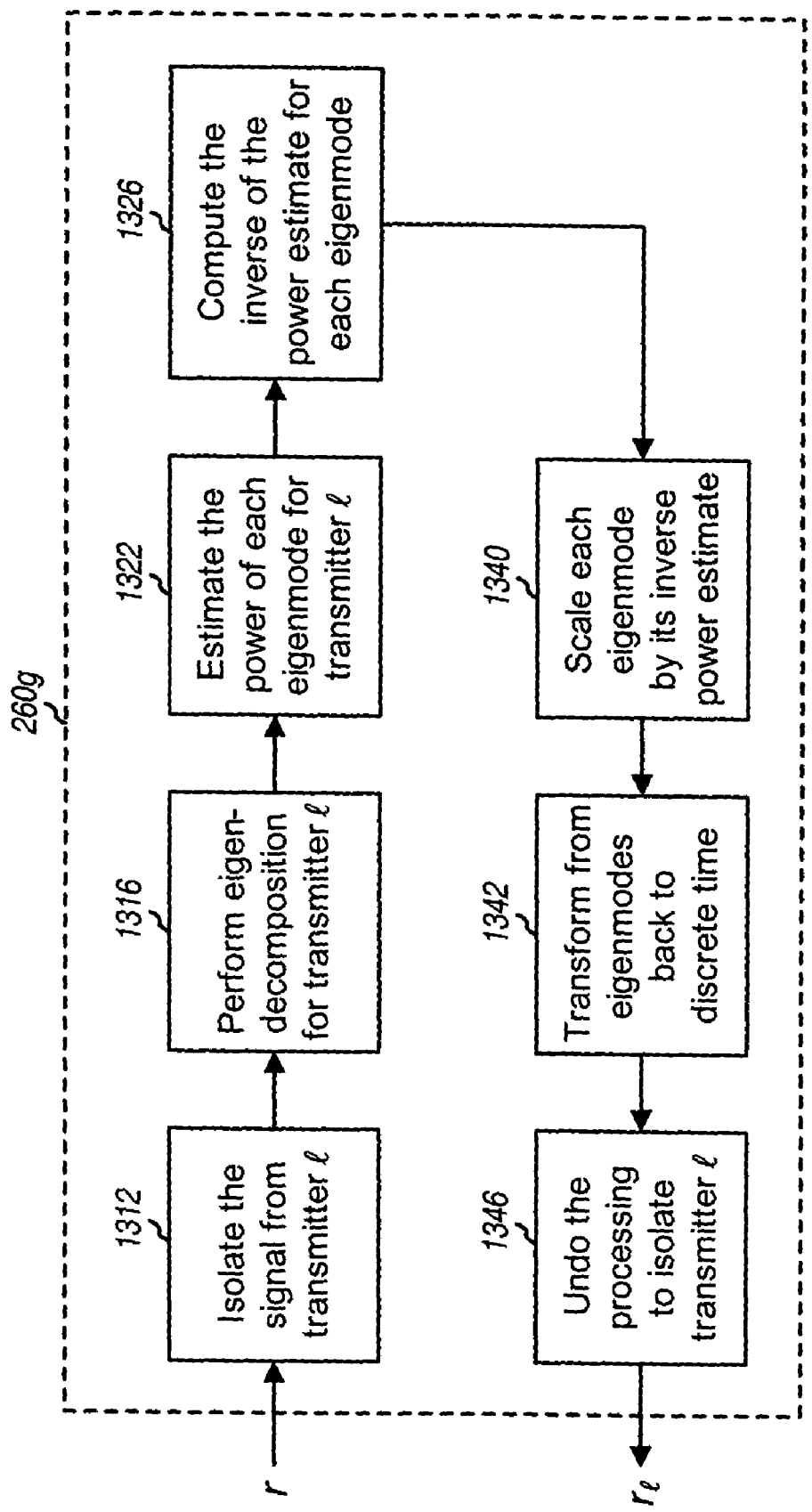
FIG. 13 shows a generic quasi-linear interference canceller.

FIG. 13 shows a block diagram of an embodiment of a generic quasi-linear interference canceller 260g, which may be applicable for various communication systems. Received samples are initially obtained. These received samples may be in the time domain (e.g., for CDMA) or the frequency domain (e.g., for OFDM). The received samples are processed to isolate the signal from an interfering transmitter l (block 1312). The processing in block 1312 may be a non-linear operation such as despreading for cdma2000, descrambling for W-CDMA, and so on. Eigen-decomposition is then performed to obtain multiple eigenmodes or orthogonal channels for transmitter l (block 1316). Orthogonal channels are obtained with different Walsh codes for cdma2000 and with different OVSF codes for W-CDMA. Hence, the eigen-decomposition may be achieved with an FHT for cdma2000 and W-CDMA. Eigen-decomposition may be achieved with a fast Fourier transform (FFT) for OFDM and FDMA systems and with other types of transform for other systems.

Interference cancellation may be achieved by performing LMMSE scaling for each orthogonal channel. In this case, the power of each eigenmode for transmitter l is estimated (block 1322). The inverse of the power estimate for each orthogonal channel is computed (block 1326). Each orthogonal channel is then scaled by the inverse power estimate for that orthogonal channel, so that orthogonal channels with larger power estimates are attenuated more (block 1340). The orthogonal channels are then transformed back to discrete time using the inverse of the transform used for eigen-decomposition (block 1342). The processing to isolate transmitter l is then undone (block 1346). The processing in block 1346 may be a non-linear operation such as spreading for cdma2000, scrambling for W-CDMA, and so on.

A wireless device may maintain one or more sets of sectors such as (1) an active set containing sectors with which the wireless device is in communication, (2) a neighbor set containing sectors that are neighbors of the sectors in the active set, (3) a candidate set containing sectors that are strongly received by the wireless device and are candidates for inclusion in the active set, and/or (4) some other sector sets. The interference cancellation may be performed in various manners. In an embodiment, interference cancellation is performed for sectors that are in the active set. The wireless device typically receives these sectors strongly and further has timing and multipath information to effectively perform interference cancellation for these sectors. In another embodiment, interference cancellation is performed for as many sectors as possible based on the processing capability of the wireless device. The sectors may be selected for interference cancellation based on their received signal strength or some other criteria The interference cancellation techniques described herein provide various advantages. First, the interference cancellation processing may be performed for one sector at a time and is a relatively simple form of interference cancellation. Second, the eigenmodes (which correspond to orthogonal traffic channels) for each sector may be efficiently obtained by performing FHT. Third, for some embodiments described above, the eigenvalues for the eigenmodes (which are power estimates used for the LMMSE interference cancellation) may be easily inverted without having to perform matrix inversion. Fourth, the interference cancellation is performed based on a low latency interference estimate for the sector being canceled, which is obtained by performing symbol processing. This is in contrast to an interference estimate obtained by decoding, re-encoding, and remodulating a frame or packet of data, which may be difficult or impractical to implement and has a higher latency because of the frame processing.

The techniques described herein may improve the overall system capacity on the forward link of a CDMA system. The capacity on the forward link is interference limited. That is, as the number of wireless devices communicating with the CDMA system increases, the total power transmitted to these wireless devices increases, which increases the interference observed by each wireless device. Eventually, the interference is such that no more wireless device can connect to the CDMA system. The techniques described herein reduce the deleterious effects of interference at the wireless device. Less transmit power may then be used for the wireless device to achieve the same level of performance, which reduces the interference to other wireless devices and allows more wireless devices to connect to the system.

The interference cancellation techniques described herein may be implemented by various means. For example, these techniques may be implemented in hardware, firmware, software, or a combination thereof. For a hardware implementation, the processing units used to perform interference cancellation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the interference cancellation techniques may be implemented with modules (e.g., procedures, functions, and so on) that perform the functions described herein. The software codes may be stored in a memory (e.g., memory 292 in FIG. 2) and executed by a processor (e.g., controller 290). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   at least one processor operative to perform:
   transforming input samples of a received signal based on a first transform to obtain received symbols for multiple orthogonal channels;
   deriving a first scaling factor based on power estimates of the multiple orthogonal channels, and deriving a second scaling factor based on a sum of inverses of the power estimates;
   scaling the received symbols for the multiple orthogonal channels with multiple gains to obtain scaled symbols for the multiple orthogonal channels based on the first and second scaling factors; and
   transforming the scaled symbols based on a second transform, wherein the first and second transforms are inverse of each other, to obtain interference-cancelled samples.

2. The apparatus of claim 1, wherein the multiple orthogonal channels comprise at least one traffic channel, and wherein the at least one processor is further operative to derive symbol estimates corresponding to the at least one traffic channel.

3. The apparatus of claim 2, wherein the symbol estimates corresponding to the at least one traffic channel are derived according to a linear minimum mean square error (LMMSE) technique.

4. The apparatus of claim 2, wherein the symbol estimates corresponding to the at least one traffic channel are derived according to a least squares (LS) technique.

5. The apparatus of claim 1, wherein the at least one processor is further operative to subtract an output of a multiplier from the received symbols for the multiple orthogonal channels.

6. The apparatus of claim 1, wherein the at least one processor is further operative to perform multiple cascaded stages of interference cancellation on the received signal.

7. The apparatus of claim 6, wherein the at least one processor is further operative to assign a particular sector of the received signal to a particular cascaded stage of interference cancellation based on a signal strength of the particular sector.

8. The apparatus of claim 6, wherein the at least one processor is further operative to assign a particular sector of the received signal to a particular cascaded stage of interference cancellation based on an arriving time of the particular sector.

9. The apparatus of claim 1, wherein the multiple orthogonal channels comprise a pilot channel and one or more non-pilot channels, and wherein a Walsh code corresponding to the pilot channel is longer than at least one Walsh code corresponding to at least one of the non-pilot channels.

10. The apparatus of claim 1, wherein the multiple orthogonal channels comprise orthogonal frequency-division multiplexing (OFDM) channels and wherein the input samples of the received signal comprise OFDM symbols.

11. The apparatus of claim 1, wherein the at least one processor is further operative to derive at least one of the multiple gains based on the second scaling factor.

12. The apparatus of claim 1, further comprising a wireless device into which the at least one processor is integrated.

13. The apparatus of claim 1, wherein the received signal is received from a plurality of sectors, the plurality of sectors corresponding to at least one base station coverage area.

14. The apparatus of claim 13, wherein the plurality of sectors includes an active set of sectors, wherein the wireless device is in communication with each sector in the active set of sectors.

15. The apparatus of claim 14, wherein the plurality of sectors further includes a neighbor set of sectors, wherein each sector in the neighbor set of sectors is a neighbor of one or more sectors in the active set of sectors.

16. The apparatus of claim 14, wherein the plurality of sectors includes a candidate set of sectors, wherein each sector in the candidate set of sectors is a candidate for inclusion in the active set of sectors.

17. The apparatus of claim 14, wherein the at least one processor is further operative to perform interference cancellation with respect to the active set of sectors.

18. The apparatus of claim 13, wherein the at least one processor is further operative to perform interference cancellation with respect to the plurality of sectors, and wherein the plurality of sectors comprises an active set of sectors, a neighbor set of sectors, and a candidate set of sectors.

19. A computer-implemented method comprising:
transforming input samples of a received signal based on a first transform to obtain received symbols for multiple orthogonal channels;
deriving a first scaling factor based on power estimates of the multiple orthogonal channels and deriving a second scaling factor based on a sum of inverses of the power estimates;
scaling the received symbols for the multiple orthogonal channels with multiple gains to obtain scaled symbols for the multiple orthogonal channels based on the first and second scaling factors; and
transforming the scaled symbols based on a second transform, wherein the first and second transforms are inverse of each other, to obtain interference-cancelled samples.

20. The computer-implemented method of claim 19, further comprising subtracting the interference-cancelled samples from the received signal.

21. The computer-implemented method of claim 19, wherein the power estimates are derived according to a linear minimum mean square error (LMMSE) technique.

22. The computer-implemented method of claim 19, wherein the power estimates are derived according to a least squares (LS) technique.

23. The computer-implemented method of claim 19, further comprising subtracting an output of a multiplier from the received symbols for multiple orthogonal channels.

24. The computer-implemented method of claim 19, further comprising performing multiple cascaded stages of interference cancellation on the received signal.

25. The computer-implemented method of claim 24, further comprising assigning a particular sector of the received signal to a particular cascaded stage of interference cancellation based on a signal strength of the particular sector.

26. The computer-implemented method of claim 24, further comprising assigning a particular sector of the received signal to a particular cascaded stage of interference cancellation based on an arriving time of the particular sector.

27. The computer-implemented method of claim 19, wherein the multiple orthogonal channels comprise a pilot channel and one or more non-pilot channels, and wherein a Walsh code corresponding to the pilot channel is longer than at least one Walsh code corresponding to at least one of the non-pilot channels.

28. The computer-implemented method of claim 19, wherein the multiple orthogonal channels comprise orthogonal frequency-division multiplexing (OFDM) channels and wherein the input samples of the received signal comprise OFDM symbols.

29. The computer-implemented method of claim 19, further comprising deriving at least one of the multiple gains based on the second scaling factor.

30. The computer-implemented method of claim 19, further comprising receiving the input samples of the received signal via a traffic channel of the multiple orthogonal channels.

31. The computer-implemented method of claim 30, further comprising deriving estimates of the input samples of the received signal by despreading the input samples with a spreading code.

32. The computer-implemented method of claim 31, further comprising performing a decovering operation on the despread input samples via a Walsh code corresponding to the traffic channel.

33. A non-transitory computer-readable medium comprising instructions that, when executed by a processor, cause the processor to:
transform input samples of a received signal based on a first transform to obtain received symbols for multiple orthogonal channels;
derive a first scaling factor based on power estimates of the multiple orthogonal channels and derive a second scaling factor based on a sum of inverses of the power estimates;
scale the received symbols for the multiple orthogonal channels with multiple gains to obtain scaled symbols for the multiple orthogonal channels based on the first and second scaling factors; and
transform the scaled symbols based on a second transform, wherein the first and second transforms are inverse of each other, to obtain interference-cancelled samples.

34. The non-transitory computer-readable medium of claim 33, wherein the instructions, when executed by the processor, further cause the processor to assign a particular sector of the received signal to a particular cascaded stage of interference cancellation based on a signal strength of the particular sector.

35. The non-transitory computer-readable medium of claim 33, wherein the instructions, when executed by the processor, further cause the processor to assign a particular sector of the received signal to a particular cascaded stage of interference cancellation based on an arriving time of the particular sector.

36. The non-transitory computer-readable medium of claim 33, wherein the multiple orthogonal channels comprise a pilot channel and one or more non-pilot channels, and wherein a Walsh code corresponding to the pilot channel is longer than at least one Walsh code corresponding to at least one of the non-pilot channels.

37. The non-transitory computer-readable medium of claim 33, wherein the multiple orthogonal channels comprise orthogonal frequency-division multiplexing (OFDM) channels and wherein the input samples of the received signal comprise OFDM symbols.

38. The non-transitory computer-readable medium of claim 33, wherein at least one of the multiple gains is based on the second scaling factor.

39. The non-transitory computer-readable medium of claim 33, further comprising a wireless device into which the non-transitory computer-readable medium is integrated.

40. The non-transitory computer-readable medium of claim 39, wherein the received signal is received from a plurality of sectors, the plurality of sectors corresponding to at least one base station coverage area.

41. The non-transitory computer-readable medium of claim 40, wherein the plurality of sectors includes an active set of sectors, wherein the wireless device is in communication with each sector in the active set of sectors.

42. The non-transitory computer-readable medium of claim 41, wherein the instructions, when executed by the processor, further cause the processor to perform interference cancellation with respect to the active set of sectors.

43. The non-transitory computer-readable medium of claim 40, wherein the plurality of sectors includes a neighbor set of sectors, wherein each sector in the neighbor set of sectors is a neighbor of one or more sectors in the active set of sectors.

44. The non-transitory computer-readable medium of claim 40, wherein the plurality of sectors includes a candidate set of sectors, wherein each sector in the candidate set of sectors is a candidate for inclusion in the active set of sectors.

45. The non-transitory computer-readable medium of claim 40, wherein the instructions, when executed by the processor, further cause the processor to perform interference cancellation with respect to an active set of sectors, a neighbor set of sectors, and a candidate set of sectors.

46. An apparatus comprising:
means for transforming input samples of a received signal based on a first transform to obtain received symbols for multiple orthogonal channels;
means for deriving a first scaling factor based on power estimates of the multiple orthogonal channels and a second scaling factor based on a sum of inverses of the power estimates;
means for scaling the received symbols for the multiple orthogonal channels multiple power gains to obtain scaled symbols for the multiple orthogonal channels based on the first and second scaling factors; and
means for transforming the scaled symbols based on a second transform, wherein the first and second transforms are inverse of each other, to obtain interference-cancelled samples.

47. The apparatus of claim 46, wherein the means for deriving comprises means for computing a plurality of inverse power estimates, means for summing the plurality of inverse power estimates and performing a trace operation on an inverse of a covariance matrix to yield a trace value, and means for computing an inverse of the trace value.

48. The apparatus of claim 47, further comprising means for multiplying each of the plurality of inverse power estimates with the inverse of the trace value.

49. The apparatus of claim 46, wherein the multiple orthogonal channels comprise at least one traffic channel, and wherein the apparatus further comprises means for deriving symbol estimates corresponding to the at least one traffic channel.

50. The apparatus of claim 49, wherein the symbol estimates corresponding to the at least one traffic channel are derived according to a linear minimum mean square error (LMMSE) technique.

51. The apparatus of claim 49, wherein the symbol estimates corresponding to the at least one traffic channel are derived according to a least squares (LS) technique.

52. The apparatus of claim 46, further comprising means for assigning a particular sector of the received signal to a particular cascaded stage of interference cancellation of the received signal based on a signal strength of the particular sector.

53. The apparatus of claim 46, further comprising means for assigning a particular sector of the received signal to a particular cascaded stage of interference cancellation of the received signal based on an arriving time of the particular sector.

54. The apparatus of claim 46, wherein the multiple orthogonal channels comprise a pilot channel and one or more non-pilot channels, and wherein a Walsh code corresponding to the pilot channel is longer than at least one Walsh code corresponding to at least one of the non-pilot channels.

55. The apparatus of claim 46, wherein the multiple orthogonal channels comprise orthogonal frequency-division multiplexing (OFDM) channels and wherein the input samples of the received signal comprise OFDM symbols.

56. The apparatus of claim 46, wherein at least one of the multiple gains is based on the second scaling factor.

57. The apparatus of claim 46, further comprising a wireless device into which the apparatus is integrated.

58. The apparatus of claim 57, wherein the wireless device comprises a cellular phone.

* * * * *